United States Patent [19]
Dawson

[11] Patent Number: 5,390,188
[45] Date of Patent: Feb. 14, 1995

[54] METHOD AND APPARATUS FOR MEASURING AND MONITORING THE PERFORMANCE WITHIN A RING COMMUNICATION NETWORK

[75] Inventor: John E. Dawson, Sunnyvale, Calif.

[73] Assignee: Synoptics, Santa Clara, Calif.

[21] Appl. No.: 101,390

[22] Filed: Aug. 2, 1993

[51] Int. Cl.⁶ .............................................. G06F 11/00
[52] U.S. Cl. ..................................... 371/20.6; 371/5.3
[58] Field of Search ......................... 371/20.6, 5.1, 5.3, 371/5.5, 29.1, 16.5, 68.1; 364/551.01, 555

[56] References Cited

U.S. PATENT DOCUMENTS

| | | | |
|---|---|---|---|
| 3,824,548 | 7/1974 | Sullivan et al. | 340/146.1 |
| 4,363,123 | 12/1982 | Grover | 371/5 |
| 4,385,383 | 5/1983 | Karchevski | 371/5 |
| 4,462,099 | 7/1984 | Braun | 371/22 |
| 4,635,214 | 1/1987 | Kasai et al. | 364/551 |
| 4,800,562 | 1/1989 | Hicks | 371/5 |
| 4,860,284 | 4/1988 | Brown et al. | 370/88 |
| 5,182,747 | 6/1990 | Frenzel et al. | 370/85.5 |

*Primary Examiner*—Robert W. Beausoliel, Jr.
*Assistant Examiner*—Norman M. Wright
*Attorney, Agent, or Firm*—Blakely, Sokoloff, Taylor & Zafman

[57] ABSTRACT

A performance measurement, communication fault detection, and fault isolation system for a ring based communication network. The present invention includes mechanisms and procedures operable within each port logic device of a communication network for counting the number of message packets lost by the network versus the number of message packets lost by the particular port or it's attached communication station. The result is a generic loss metric for that particular port. Positive counts represent packets lost by the remainder (i.e., not including the particular port) of the network while negative counts represent packets lost by the port or its attached station. The present invention also includes embodiments wherein the above capabilities are provided for a group of ports but only for messages that contain a particular targeted address as the packet's origin (i.e., targeted loss metric). A source address embodiment is provided so that an individual port responds only to messages containing the address of its attached station. If the attached device is a single station then by computing the difference between the generic loss metric and the source address loss metric for a given port, a single attached station loss metric is determined. By communicating each loss metric result to a central NMS and therein analyzing the results of the generic loss metrics, single and multiple faults within the communication network may be detected and isolated. Dual homed station thru connection errors and duplicate address error configurations may also be isolated by the present invention.

56 Claims, 15 Drawing Sheets

METHOD AND APPARATUS FOR MEASURING AND MONITORING THE PERFORMANCE WITHIN A RING COMMUNICATION NETWORK

BACKGROUND OF THE INVENTION

(1) Field of the Invention

The present invention relates to the field of performance measurement of devices within a communication system or network. More specifically, the present invention relates to the field of device performance measurement, fault detection and fault isolation within a ring based communication network by monitoring of traffic through individual parts of the network.

(2) Prior Art

Local area networks, also called "LANs," are largely used as a means to provide a communication network between various workstations, peripherals and elements of a computer system. Using local area networks, several otherwise independent computer systems may be communicatively coupled together so that each may share information with the others or one may control the other. Also, other computer system components or peripherals, such as disk drives, printers, modems, display devices, etc. may be coupled as stations or nodes to the local area network for communication and control between the workstations. Therefore, within a local area network several workstations may share information between other workstations and/or control other computer system components or peripherals. Local area networks have proven to be a very efficient and advantageous way to interconnect office computers and peripherals into centralized computer systems for information exchange and timesharing of computer peripherals. Therefore, systems are needed and desirable that can monitor the communication performance of such network devices and transmission pathways and that can be used to detect and isolate faults.

In a ring communication topology protocols (i.e., FDDI and token ring), units or nodes of the communication network may be communicatively interconnected in a close-end ring fashion with each node occupying a particular position within the overall communication network. Communication packets (messages) within the network will travel in the same direction along a closed loop communication pathway between each station. Messages that traverse this communication system mainly include the token (in token ring networks), dam frames, and network control packets. These messages are often referred to as communication traffic. A particular node (i.e., network management station) within the communication system may be designated as an active monitor which will control several communication features of the communication ring network.

Managing a local area network requires a determination of the degree of effectiveness that a port or its attached device functions on the network with relation to the remainder of the network. In order to simplify the above process, it would be advantageous to determine if a particular port (station or link) is functioning better, worse, or about the same as the rest of the devices on the network. Aspects of the present invention perform such function. It would further be advantageous to measure error rates on a ring based network and compare performance of a particular port or its attached device to the remainder of the network. The present invention performs such functions. It would further be advantageous to perform the above functions within the port logic of the communication ports of the system. The present invention provides such capability.

The communication scheme of a ring topology network requires that each and every node of the ring be operating properly to repeat ("recast") messages over the ring. A disastrous effect occurs within a communication ring if one particular node or communication link malfunctions and will not accurately repeat messages thus reducing the overall performance of the devices on the network. A faulting communication line, port, or station may intermittently interrupt or break communication flow causing message dataframes to be lost and/or corrupted. This may severely reduce the performance of the entire ring network as messages may not flow past the malfunctioning node or transmission line. Therefore, it would be advantageous to provide a system within a ring based communication network that can be used to determine the degree of performance of each port or attached device on the network. It would be advantageous to utilize the performance information for each port to then detect and determine the location of transmission faults. The present invention offers such capability.

Several reasons may cause a node along the communication ring to malfunction and thus lose or corrupt message packets. First, a node having an incorrect communication frequency may be inserted into the token ring network. The incompatible frequency will lock out the newly added node from the network. Or, a faulty cable or receiver may inject noise into the system and cause errors in message packets to be undetectable. In any of a number of different scenarios, it would be advantageous to be able to determine how particular stations are performing with respect to the entire communication network and use this information for fault detection and isolation. The present invention offers such an advantageous solution.

Communication networks of the prior art are composed of prior art concentrators. Due to the nature of the electronics within the concentrators of the prior art, the messages traveling through the ports to adjacent stations may not be read or analyzed by the ports themselves because clocking signals within the dataframes may not be recovered by the port logic. In effect, the port logic of prior art concentrator designs is rather limited. The decoding required to read the clocking signal from the serial data flowing between the stations (and ports) is a complex process that is not supported within all concentrators of the prior art design. In this sense, the ports and port logic of the prior art are passive with respect to analyzing the dataframes that pass on the communication ring. Communication errors in the prior art systems are often non-isolatable due to the difficulty of monitoring the messages into and out of the legs of the network. Therefore, it would be advantageous to provide ports and port logic within a given concentrator that have enough intelligence to analyze the data streams flowing to and from the coupled stations, and further, it would be advantageous to use such functionality to help provide fault detection and isolation capabilities for the overall network. The present invention offers such advantageous capabilities.

Because prior art token passing systems do not offer the ability for a port to analyze the dataframe packets that traverse the network, any form of dataframe analysis would have to occur within the stations of the network. This is not advantageous because a system for fault analysis that is to watchdog over the communication stations of the network should not execute within or rely on the proper functioning of those same stations for its own error free operation. Given this system, a faulty station may corrupt these watchdog functions resulting in the faulty station not being detected. It would be advantageous to place any fault detection and isolation system outside the scope of the network stations so that the system does not rely upon the error free operation of these stations for its own proper operations. The present invention provides such an advantageous system.

Accordingly, it is an object of the present invention to provide a mechanism within a ring based network for device performance measurement, fault detection, and fault isolation. It is further an object of the present invention to provide a mechanism to determine how well a port or attached device (station) functions on the network compared to the remainder of the network by determining if a particular port (station or link) is functioning better, worse, or about the same as the rest of the communication network. It is yet another object of the present invention to provide a mechanism that can measure error rates on a ring based network and compare performance of an attached device to the rest of the network (i.e., on several ports in a network concentrator) in order to gauge overall error performance and indicate where in the network communication errors are occurring. It is yet another object of the present invention to provide a mechanism that may monitor, at each port, the number of messages entering and exiting each port that originate from a targeted source address. It is an object of the present invention to compile, for each port, an indication of the performance of that port and utilize this information reported from each port to detect and isolate communication hulls. It is further an object of the present invention to accomplish the message monitoring aspects of the above features within the port logic of the ports of the communication network of the present invention. These and other objects of the present invention not specifically stated herein will become evident upon review of the discussions of the present invention to follow.

SUMMARY OF THE INVENTION

A performance measurement, communication fault detection, and fault isolation system for a ring based communication network is described. The present invention includes mechanisms and procedures operable within each port logic device of a ring based communication network for counting the number of message packets lost by the network versus the number of message packets lost by the particular port or its attached communication station. The result is a generic loss metric for that particular port. Positive counts represent packets lost by the remainder (i.e., apart from the particular port) of the network while negative counts represent packets lost by the port or its attached station. The present invention includes the above wherein a particular port responds only to messages containing an address of the device coupled to the particular port to generate a source address loss metric for that port; when the attached device is a single attached station then a SAS loss metric may be generated as the difference between the generic loss metric and the source address loss metric for that particular port. The present invention also includes an embodiment wherein the above capabilities are provided but only for messages that originate from a particular station having a target source address resulting in a targeted source address loss metric for every port logic device of the network; each port is loaded with the targeted source address. By communicating each loss metric result to a central NMS and therein analyzing the results of the various loss metrics, single and multiple faults within the communication network may be detected and isolated. Network configuration errors involving dual homed station and duplicate addresses may be isolated by the present invention.

More specifically, embodiments of the present invention include an apparatus for measuring performance of a port within a communication network having a plurality of ports, the ports capable of individually interfacing with attached stations or devices, the apparatus comprising: fast packet detecting means operable within the port of the network for detecting a message packet entering the port, the first packet detecting means coupled to an input communication stream to the port; second packet detecting means operable within the port for detecting a message packet exiting the port, the second packet detecting means coupled to an output communication stream from the port; and counter means for maintaining a count value indicating an amount of messages lost or corrupted by the port and indicating an amount of messages lost or corrupted by the network, the counter means communicatively coupled to the first packet detecting means and communicatively coupled to the second packet detecting means.

Embodiments of the present invention include the above and wherein the first packet detecting means comprises means for decrementing the count value of the port upon detection of a good entering message packet and wherein the second packet detecting means comprises means for incrementing the count value of the port upon detection of a good exiting message packet. Embodiments of the present invention include the above and further comprising means for reporting the count value of the port to a network management station, the count value representative of a predetermined sample time interval; and means for generating a visualization of the count value on a display screen. The present invention includes the above wherein the first packet detecting means and the second packet detecting means of a given port respond only to packets that originate from an attached station to the given port.

Embodiments of the present invention also include an apparatus for determining fault location within a ring communication network having a plurality of ports, the ports capable of individually interfacing with attached stations or devices, the apparatus comprising: means for receiving a target address, the means for receiving a target address operable within a first port of the network; first packet detecting means operable within the first port for detecting a message packet originating from the target address and entering the first port, the first packet detecting means coupled to an input communication stream to the first port; second packet detecting means operable within the first port for detecting a message packet originating from the target address and exiting the first port, the second packet detecting means coupled to an output communication stream from the first port; and counter means for maintaining a loss metric indicating an amount of messages originating from said target address and lost or corrupted by the first port and indicating an amount of messages originating from said target address and lost or corrupted by the network, the counter means communicatively coupled to the first packet detecting means and communicatively coupled to the second packet detecting means.

Embodiments of the present invention also include the above and further include a method of determining the presence of multiple fault conditions utilizing a source target address loss metric. The present invention includes an embodiment directed at detecting the presence of a dual homed station thru connection condition using the above loss metric technique. Also included within the present invention is an embodiment directed at detecting the presence of two stations having duplicate addresses. The present invention also detects repetitive transmission breaks and dual ring faults using the loss metric technique. The present invention includes embodiments directed at the ability to exclude messages containing certain frame classes from a particular loss metric technique and also a two-port loss metric ability. The present invention also includes a communication system that embodies port logic containing the ability to generate loss metrics.

DETAILED DESCRIPTION OF THE INVENTION

Figure 1:
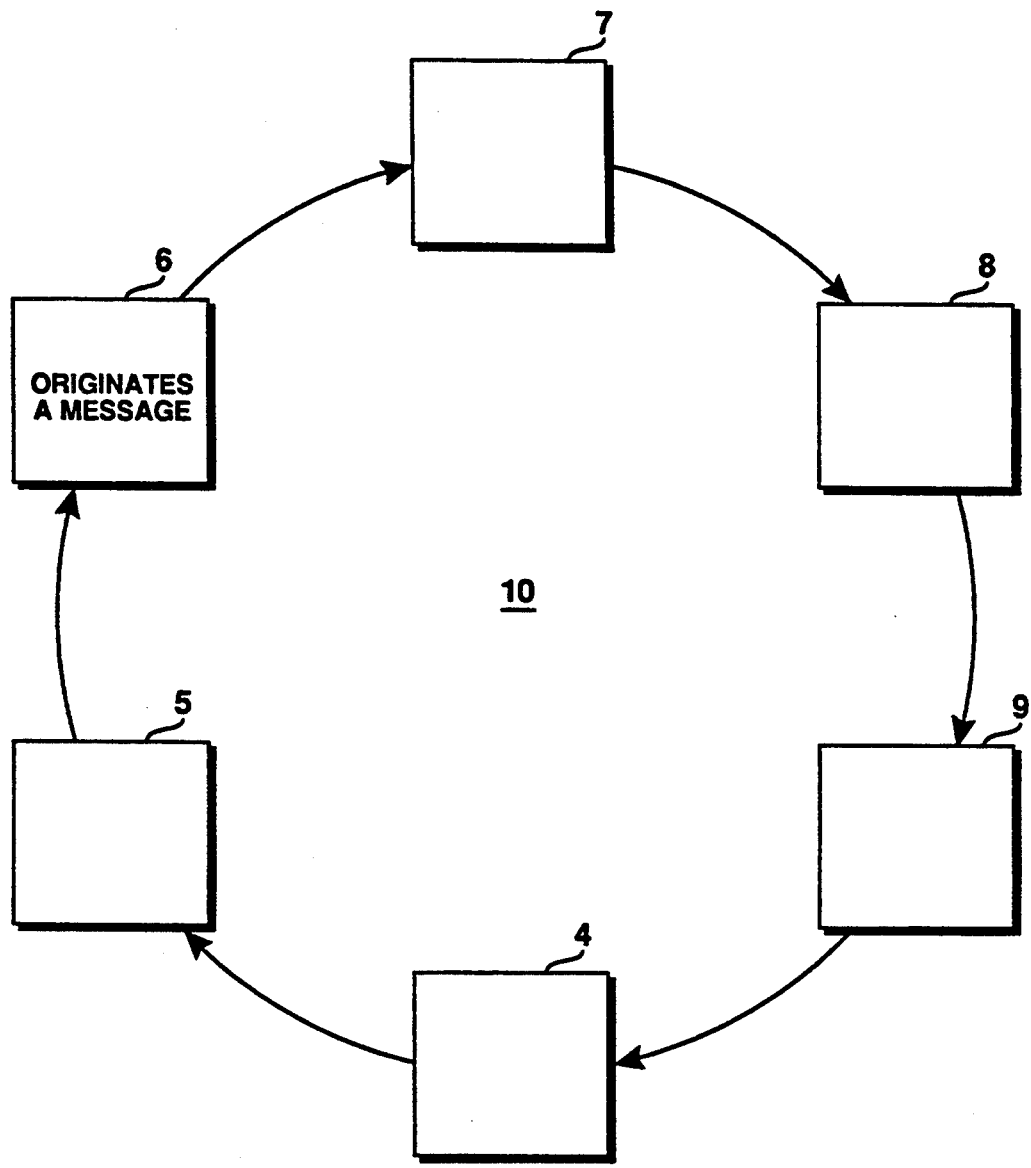
FIG. 1 illustrates a diagram of a ring based communication network topology composed of individual communication stations.

The present invention includes a system, which operates within the expanded port logic of the ports of the Fibre Distributed Data Interface (FDDI) communication standard which may utilize token passing protocol. Aspects of this standard are further explained in the FDDI standard X3T9.5/84-49, entitled FDDI Station Management. The present invention utilizes the capabilities of the above FDDI communication standard that allow the ports and associated port logic to recover data clocking signals from network data streams which allow individual ports to mad and analyze the dataframe packets that traverse the communication ring. Specifically, the present invention offers a system having components that are associated with each port of an FDDI communication network. For each port, the present invention analyzes the dataframes that traverse the port to and from each coupled node. The port logic for individual ports is programmed to detect the passage of good message packets entering and exiting the port. Using such a system, the present invention provides a loss counter for each port that indicates the passage of message packets or dataframes to and from each port. If a message packet or dataframe is lost, the present invention loss counter for an individual port will update depending on the location of the fault within the network. Further, ports of the present invention may be programmed to respond only to messages that originate from a target source address and may also be programmed to respond only to messages that are not of a predetermined frame class. A particular port of the present invention may also be uniquely programmed to respond to a source address of an attached device to the particular port.

In the following detailed description of the present invention numerous specific details are set forth in order to provide a thorough understanding of the present invention. However, it will be obvious to one skilled in the art that the present invention may be practiced without these specific details. In other instances, well known methods, components, processes, and systems have not been described in detail as not to unnecessarily obscure the present invention. Unless specifically stated otherwise as apparent from the following discussions, it is appreciated that throughout the present invention, discussions relating to functions of the NMM or NMS units of the present invention utilizing terms such as "processing" or "computing" or "calculating" or "analyzing" or "determining" or "displaying" or the like, refer to the action of a computer system, or similar electronic computing device, that is executing a program to manipulate and transform data represented as physical (electronic) quantifies within the computer system's registers and memories into other data similarly represented as physical quantities within the computer system memories or registers, which may effect an output that is visually displayed on a screen or on a permanent hardcopy rendition.

Ring Based Communication Network of Present Invention

FIG. 1 illustrates a ring communication network 10 and is comprised of six communication stations (often called nodes) numbered 4-9. As shown, station 6 originates a message over the ring network. That message package will then be communicated over each of the stations of the ring to reach its destination station and station 6 will then remove the communication package upon receiving the message packet back from the ring. As the message traverses the ring it will be recast by each station; the message will indicate within its dataframe that its source address is station 6. A detailed description of such a ring based network system may be obtained from the IEEE 802.5 communication standard. Since a detailed description of such well known communication network is not required to illustrate the advantageous elements of the present invention, it has not been completely reproduced herein.

In a ring based structure, messages are sent over the ring 10 in a particular direction indicated by the arrows of the ring. Each node is called a repeater because it repeats a message through the ring whether or not the particular message is destined for that node so that all messages at some time will traverse over the entire node in order to reach the intended target or destination node. It is appreciated that even the target node will repeat the message. Eventually the source of the message will :receive the message over the ring and will remove it from the communication network. Therefore, the communication scheme of a ring topology communication network requires that each and every node of the ring be operating properly to repeat messages around the ring. Communication faults of network 10 effect the communication performance of the attached stations.

Figure 2:
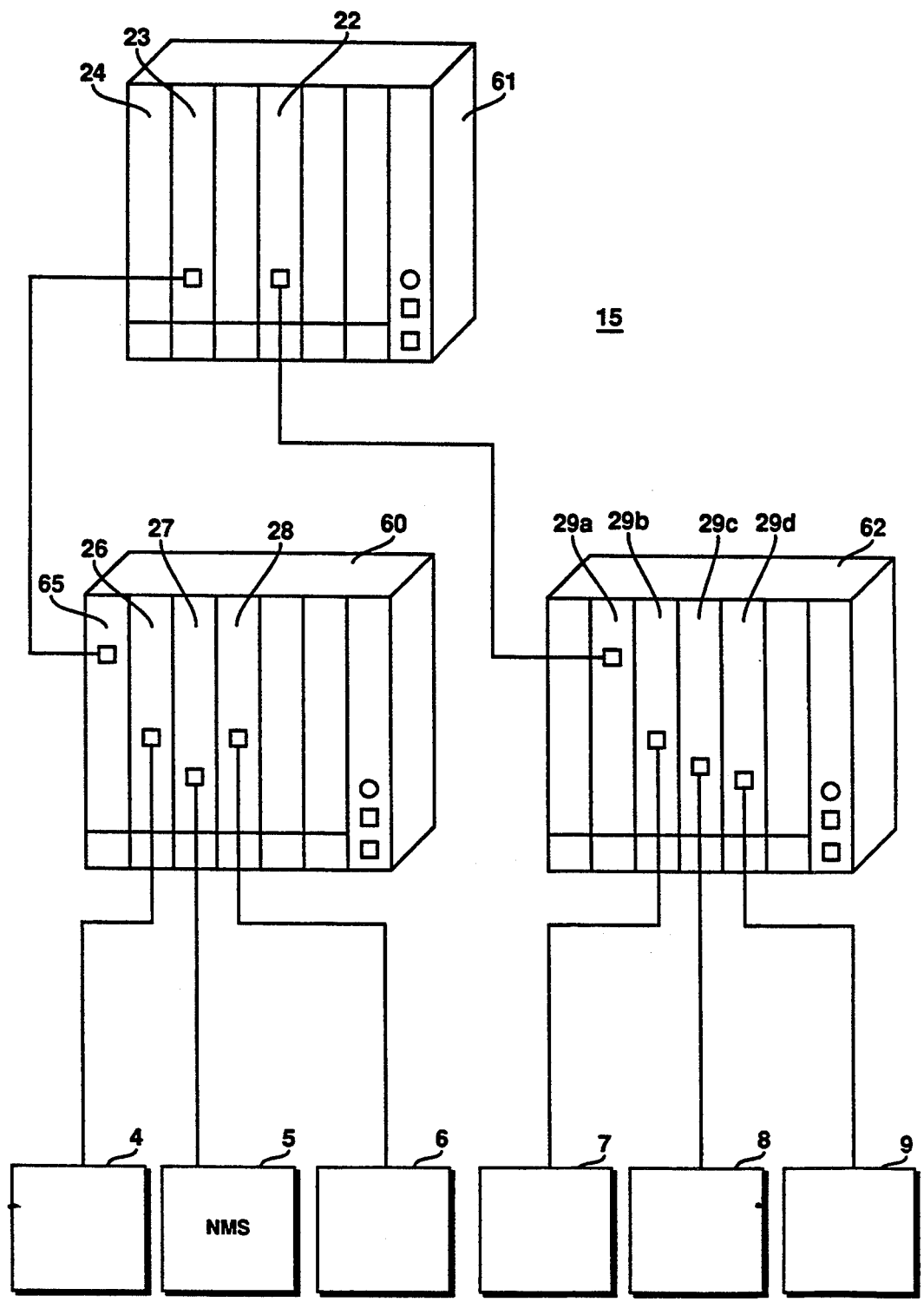
FIG. 2 illustrates a physical configuration of a ting based communication network of the present invention including separate concentrators and associated node connections.

It is helpful to understand how an individual ring communication network ("LAN") 10 is physically implemented and how it provides connections to communication stations within a ring FDDI communication network used by the present invention. Individual LANs may be constructed using concentrators. FIG. 2 illustrates one physical configuration 15 of the FDDI communication network 10. Generally, FIG. 2 shows that LAN 15 is composed of three concentrators. Concentrator 60 provides a communication hub for stations 4, 5 and 6 while concentrator 62 provides a communication hub for the remainder of the stations 7, 8, and 9. Each station is coupled to a port within a connection module of the associated concentrator; a module may house several ports. Concentrator 61 provides a communication pathway and communication control between concentrators 60 and 62. In this fashion, all of the six stations are communicatively connected together in the ring fashion of FIG. 1. Each concentrator has an associated network management module (NMM) that controls traffic over the concentrator, there are three NMMs for this communication network 15 and they are 24, 65 and 29a. The NMMs are located on modules within slots of the associated concentrators. An NMS or network management station may be implemented as one of the attached stations, such as station 5.

With reference to FIG. 2, three concentrator units 60, 61, and 62 are shown coupled together by conventional communication cable. The concentrators shown are intelligent concentrators in that they provide more than a mere coupling location but also provide communication control and error handling within the communication system. Each concentrator has several modules which are shown as vertical blocks within each concentrator. Modules are coupled together within slots of a concentrator which are all coupled together via a communication (management) bus 67 (not shown in FIG. 2) which is common to all modules. Each module houses several ports and each port may couple to a different station. A port is comprised of port logic to manage the traffic flow through the port and between its attached station or device. The NMM is responsible for network communication control within each concentrator and also for controlling and providing communication capability between individual concentrators. Specifically, concentrator 60 is coupled via NMM 65 to module 23 of concentrator 61; module 23 is an interconnection module. Further, concentrator 62 is coupled via NMM 29a with module 22 of concentrator 61; module 22 is an interconnection module. In this way, all three concentrators are communicatively connected together and allow their associated stations to form a single ring communication topology. Therefore, it can be appreciated that a communication network of the present invention is not necessarily composed of a single concentrator but several concentrators may to coupled together to form a single ring based communication network 15.

Overview of the Preferred Embodiment of the Present Invention

Figure 3:
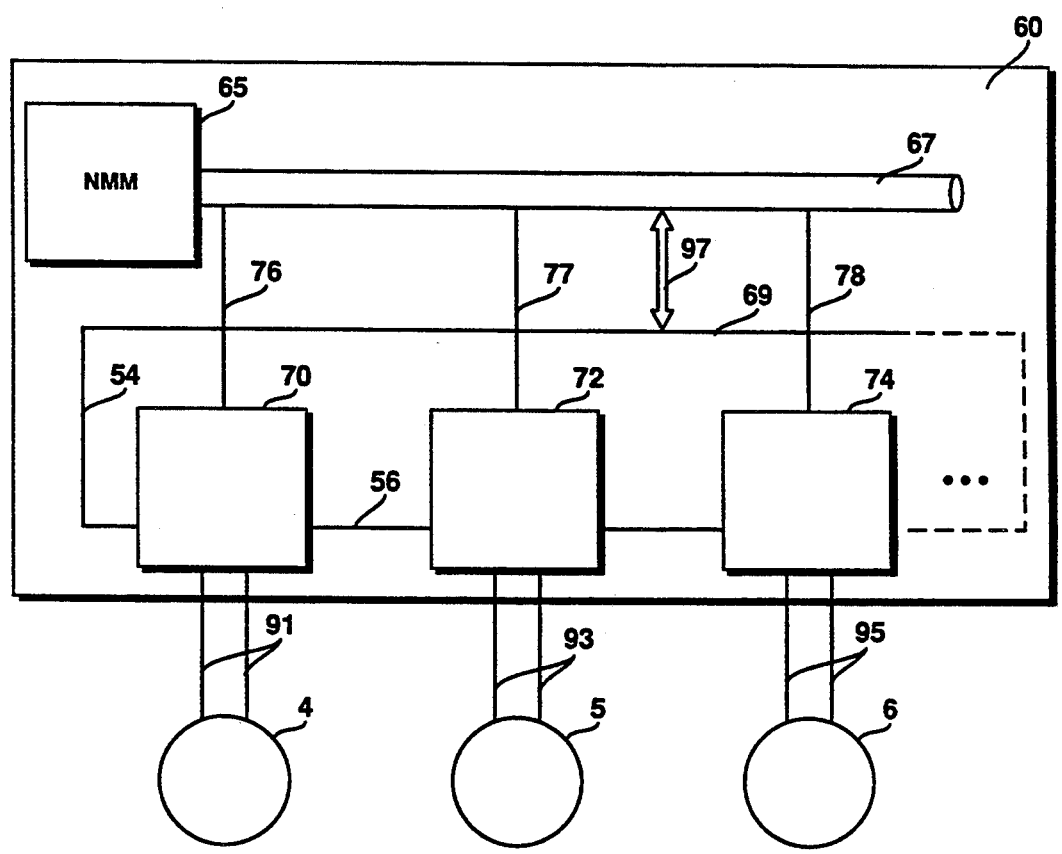
FIG. 3 represents a block diagram of a concentrator of the present invention and illustrating port devices of the present invention.

With reference to FIG. 3, an individual concentrator 60 of the present invention is illustrated. The concentrator contains a Network Management Module (NMM) 65 that will be further described below. The NMM 65 controls the communication among the nodes attached to the concentrator 60. The NMM 65 is coupled to a communication bus 67 which couples all of the ports of the present invention via flow 97 which includes 76, 77, and 78. There are many nodes attached to the concentrator 60. Three of such nodes are illustrated in FIG. 3; they are station 4, station 5 and station 6. It is appreciated these stations may be data terminal equipment, computer systems, or other communication LANs. Each node is coupled to a separate communication port 91, 93 and 95, respectively, for the stations illustrated.

Each communication port (91, 93, 95) of the concentrator 60 of the present invention contains an associated port logic block. There are three ports illustrated in FIG. 3 for clarity but a single concentrator may possess many more. For instance, port logic block 70 contains the logic for port 91, logic block 72 contains the port logic for port 93 and block 74 contains the port logic for port 95. It is appreciated that each of the port logic blocks contains well known device components of the FDDI standard X3T9.5/84-49, entitled FDDI Station Management (the "FDDI standard"), such as: (1) a physical layer interface (PHY) for recovery of the clock signal from within the dataframes; (2) the physical media drivers (PMD) for driving the output signals to the communication stations; and (3) switching circuit elements for routing information flow to the associated node or directly to the neighboring port logic as well as other components of the present invention. Reference is made to the above FDDI standard for access to port logic detail exceeding that required for a complete understanding of the present invention (see pgs. 169-222, et al.). It is appreciated that the loss metric circuitry and message packet detection circuitry of the present invention operates in conjunction with the physical layer interface of the above FDDI standard. To the extent required to understand pertinent aspects of the present invention, components of the above standard are explained in detail herein. However for a further understanding of the elements of the physical layer interface, i.e., for an understanding in excess of that required to fully comprehend the present invention, reference is made to the above FDDI standard.

Included within each of the above port logic devices (70, 72, and 74) are also packet detectors that are utilized in the loss metrics of the preferred embodiment of the present invention which will be explained in more detail to follow. At this point, it is appreciated that the message detectors which detect the presence of a packet entering a particular port and that detect a message exiting a particular port are embodied within the port logic circuits (70, 72, 74) of the ring communication network. The port logic blocks of the present invention perform the required functions for receiving information from adjacent ports in the communication ring, transmitting that information to the associated node coupled to the port, receiving information from the associated node (station) coupled to the port and transmitting information received from the associated station to the adjacent port in the communication ting. Information entering port logic 70 enter via line 54 and packets exiting port logic 70 exit via line 56 to the next and adjacent port logic block 72.

Generally, the present invention port logic blocks (i.e., units 70, 72, and 74) each include the function of analyzing the dataframes that traverse the port to determine: (1) the number of good packets that enter a particular port logic block; and (2) the number of good packets that exit from a particular port logic block. The present invention also includes circuitry to combine the results of the above two functions to generate a generic loss metric for each port within the ting communication network. This is called the generic loss metric for each port. A modification of the generic loss metric limits a particular port to responding only to message that originate from an attached device to that port. This is called the source address loss metric and the source address is determined by the particular port through port/address association. A special case of the source address loss metric is provided by the present invention wherein the source address is a single attached device. Such embodiment is called the single attached station loss metric.

A modification of the above functionality allows each particular port to perform the above two functions for messages that originate froth a particular port address (target source address). This is called the target source address loss metric for each port. In other words, a target source address is loaded into each applicable port logic block (i.e., from the NMM management bus 67 or from the NMS) and each particular port may then analyze the dataframes that traverse the port to determine: (1) the number of good packets that enter a particular port logic block and originate from the target source address (i.e., contain the target source address); and (2) the number of good packets that exit from a particular port logic block and originate from the target source address.

A further modification of the above functionality allows each particular port to perform the above two functions (for the various loss metrics) responsive to only messages that are of a predetermined frame class. Therefore, messages outside of the particular frame class will be ignored by the loss metric. According to the below discussions, the methodology and components utilized to specifically perform the above capabilities will be further explained and illustrated.

The NMM 65 of the present invention is coupled to each of the port logic blocks 70, 72 and 74 via coupling 76, 77 and 78 respectively. These couplings stem from a central management bus 67. In so coupling, the NMM 65 of the present invention may directly communicate with and access the generic loss metric results, the source address loss metric ("SA loss metric"), the single attached station loss metric ("SAS loss metric") results, and the targeted source address loss metric results of the present invention which reside within each of the port logic blocks. Further, the NMM 65 may also communicate the targeted source address to the attached ports for the targeted source address loss metric or may communicate the source address to the pertinent port for the source address loss metric; either address may ultimately originate from the NMS by automatic or user interface.

NMM and NMS of the Communication Network

Functional components of the network management module (NMM) and network management station (NMS) pertinent to the present invention will be explained further below with reference to FIG. 4. It is appreciated that management and control of the various loss metrics of the particular ports of the communication station may be accomplished via an NMM or a NMS of the present invention. An NMM is a module specially adapted to automatically manage a particular concentrator while an NMS provides user interface with the communication network (i.e., for error indication and correction). To this extent, high level control and communication functions within the NMS and NMM that relate to the generic loss metric and source address loss metric may be implemented in either software or hardware and such selection is purely one of design choice. To the extent that such functions (which will be described in greater detail below) are implemented via software, the following discussion illustrates the components (and configuration) of the NMM and/or NMS required to execute the software instructions.

Figure 4:
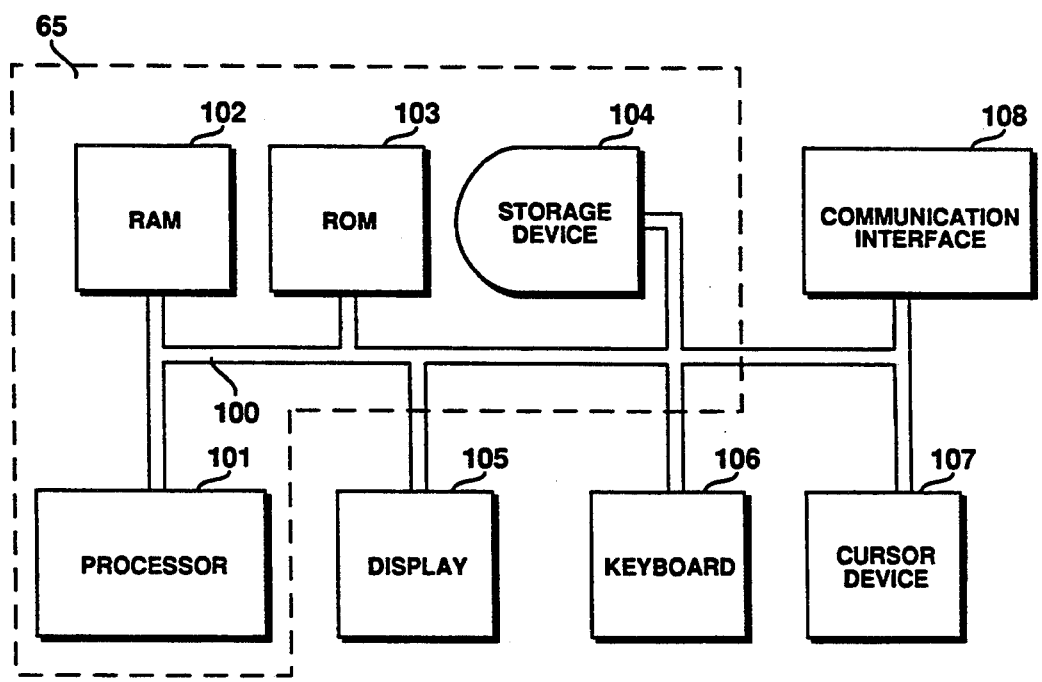
FIG. 4 illustrates in block diagram form the components of an NMM and NMS of the ring communication network of the present invention.

Generally, the NMM 65 of the present invention of FIG. 4 comprises a bus 100 for communicating information, a central processor, 101 coupled with the bus for processing information (such as image data and acquired counts) and command instructions, a random access memory 102 coupled with the bus 100 for storing information and instructions for the central processor 101, a read only memory 103 coupled with the bus 100 for storing static information and command instructions for the processor 101. Also available for interface with the NMM 65 of the present invention is a data storage device 104 such as a magnetic disk or optical and disk drive which may be communicatively coupled with the bus 100 for storing information and command instructions.

Network management systems (NMS) devices of the present invention are similar in function to the NMM unit 65 but contain user interface devices such that the network may be monitored and controlled by a network user or technician. In the well known manner, an NMS is coupled to the communication station as a communication station. It is appreciated that NMS units containing user interface capabilities contain the above structures and in addition contain a display device 105 which may be communicatively coupled to the bus 100 for displaying information to a network management technician, such as the generic loss metrics of the present invention. The display device 105 utilized with the NMS of the present invention may be a liquid crystal device, cathode ray tube, or other display device suitable for creating graphic images and alphanumeric characters recognizable to the user. The NMS system may also contain an alphanumeric input device 106 including alphanumeric and function keys coupled to the bus 100 for communicating information and command selections to the central processor 101 (such as an input target source address), a cursor control device 107 coupled to the bus for communicating user input information and command selections to the central processor 101 based on a user's hand movement. The cursor control device 107 allowing the network user to dynamically signal the two dimensional movement of a visible symbol (pointer) on a display screen of the display device 105 which may be used to select a particular station as a target address. Many implementations of the cursor control device are known in the art including a trackball, mouse, joystick or special keys on the alphanumeric input device 105 capable of signaling movement of a given direction or manner of displacement.

The NMS unit may also contain an input and output device 108 coupled to the bus 100 for communicating information to and from the, NMS. The communication device 108 may be composed of a serial or parallel communication port or may be a communication modem. It is appreciated that such communication device 108 may provide an interface between the bus 100 and the user interface devices (keyboard 106, cursor 107, display 105) of the NMS. In this case, the user interface devices will reside within a terminal device this is coupled to the communication device 108 so that the processor 101, the RAM 102, the ROM 103 and the storage device 104 may communicate to the terminal and vice-versa. Therefore, the NMS of the present invention includes the components of NMM 65 plus units 105, 106, 107 and 108.

Generic Loss Metric of the Present Invention

The generic loss metric is an indicator, associated with each port of the present invention, that combines the general performance of that port against the remainder of the network in general. With respect to each port, the generic loss metric monitors the difference between good message traffic flowing through each port. The generic loss metric of the present invention operates in the following manner. Packets (dataframes or "messages") are monitored by an individual port logic unit as they enter the port logic from the network. The packet is tested to determine if the packet is good (i.e., it checks out against the CRC (cyclical redundancy checksum) number, it is not corrupted, and it is properly terminated). If good, the entering packet causes a generic loss counter to decrement by one. The packet is then sent to the attached station of the port. Upon detection of a good packet exiting a particular port (i.e., by the port logic unit), the generic loss counter for that port is then incremented by one for each good packet that exists. Therefore, entering good packets decrement the generic loss counter for an individual port and good packets that exit the port increment the generic loss counter.

FIG. 5(A) through 6(C) illustrate six possible cases that may effect the count of the generic loss counter for each particular port and these cases illustrate the manner in which a generic loss metric indicates fault position within a communication network. The cases illustrated in FIGS. 5(A) through 5(C) examine the flow of packets entering port logic 70 from the network and exiting port logic 70 to the remainder of the network. The three cases illustrated in FIGS. 6(A) through 6(C) examine the flow of packets (1) exiting port logic 70 from the attached station 4 and (2) re-entering port logic 70 (e.g., after being repeated around the network). These are the only two pathways that packets may enter and exit port logic 70 (i.e., from the network or from the attached station).

Figure 5A:
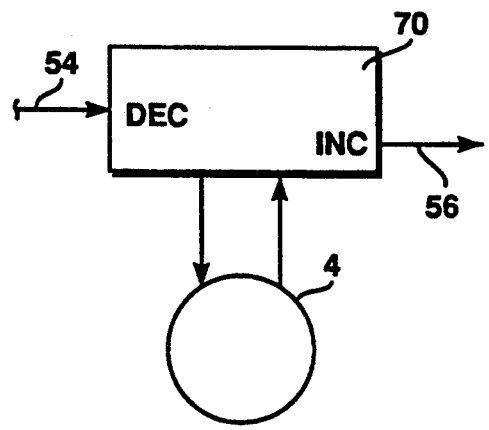
FIGS. 5(A) illustrates a case of the generic loss metric of the present invention wherein a good packet enters a port logic device of the present invention and also exists as good.

No Net Change in Generic Loss Counter. With reference to FIG. 5(A), the port logic 70 of the present invention as described above is illustrated and is coupled to its attached communication station 4. According to this case, a good message packet is detected by the port logic 70 entering the port over line 54 and thus the generic loss counter is decremented by one. The packet is sent to station 4 which relays the packet back to the port logic 70 via line 56 in good condition. The good packet is then detected exiting the port 70 via line 56 which causes the generic loss counter to increment by one. As shown, both decrement and increment are marked within port logic 70. The net effect of the above case is that the generic loss counter for this port does not change with respect to this good packet (i.e., decrement followed by increment is a "no change" result).

Figure 5B:
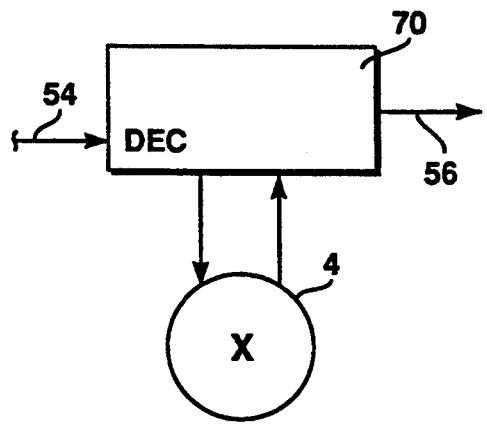
FIG. 5(B) illustrates a case wherein a good packet enters a port logic device of the generic loss metric of the present invention but is lost or corrupted within the attached device or within the port.

Negative Change in Generic Loss Counter. FIG. 5(B) illustrates the case of the present invention in which the attached station 4 effects the packet such that the packet is no longer in good condition. This may occur if the packet is corrupted (i.e., bad CRC count) or if the packet is lost by station 4. In the case of FIG. 5(B) the good packet is detected entering port logic 70 from line 54 and therefore the generic loss counter is decremented by one. At some location thereafter, either within station 4 or due to the communication line coupled between port 70 and station 4, the packet is lost or corrupted. If the packet is lost then no packet is detected exiting port 70 over line 56 and therefore the generic loss counter for port 70 is not incremented; the net result is a negative change in the generic loss counter. If the packet is merely corrupted then it will be detected exiting port logic 70 but it will also be detected as bad and therefore the port logic 70 will not increment the generic loss counter; the net result of either of the above is a negative change in the generic loss counter of the present invention. As shown, only decrement is marked within port logic 70. Therefore, FIG. 5(B) illustrates the case of a fault located in the station 4 or within the communication lines coupling the station 4 to the port logic 70. This fault results in a net negative change in the generic loss counter. Net negative values of the generic loss counter represent a fault within the port 70 or its attached station 4 apart from the network.

Figure 5C:
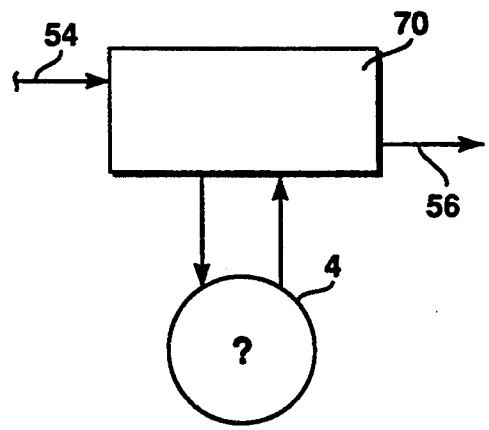
FIG. 5(C) is a representation of the generic loss metric of the present invention wherein a bad message enters the port logic and also exists the port logic as bad or is lost within the port or its attached device.

No Net Chance in Generic Loss Counter. FIG. 5(C) illustrates the case of the present invention in which a bad packet is detected as entering the port logic 70. If the error packet is detected it will not decrement the generic loss counter because the packet is not detected as good. It does not matter if the station 4 is also faulty because the port 70 will similarly not increment the generic loss counter upon the error packet exiting from the port logic 70 or if the error packet is completely lost within station 4. As shown, neither decrement nor increment are marked within port logic 70. The net result in the generic loss counter upon an error packet entering port 70 is that no net change in the loss counter is recorded.

Figure 6A:
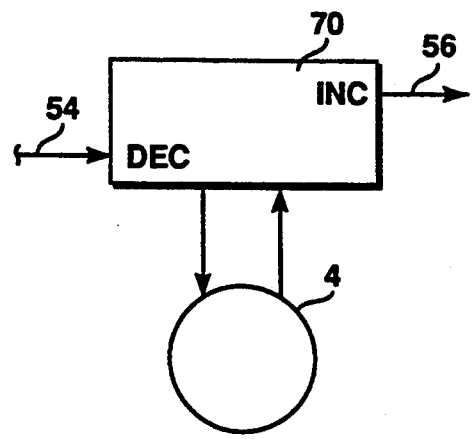
FIG. 6(A) represents the communication case within the generic loss metric of the present invention wherein a good message is generated by the attached station of the port logic, recast over the network, and returns from the remainder of the network as good.

No Net Change in Generic Loss Counter. FIG. 6(A) illustrates the case of the present invention in which a good packet is originally generated by station 4 and is detected as exiting port logic 70 over line 56. This causes the generic loss counter to increment by one for port logic 70. The good packet traverses the remainder of the ring communication network and is then detected, as good, entering port logic 70 from line 54. This causes the port logic 70 to decrement the generic loss counter by one. As shown, both decrement and increment are marked within port logic 70. The net effect of this case is that no change results within the generic loss counter for port logic 70 (i.e., increment followed by decrement). As shown in FIG. 6(A) both decrement and increment are marked.

Figure 6B:
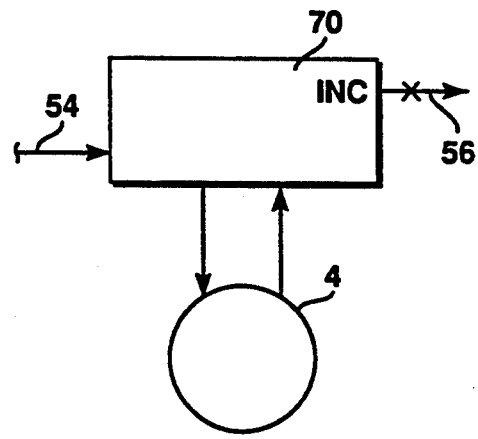
FIG. 6(B) illustrates a case of the generic loss metric embodiment of the present invention wherein a good message is generated by the attached station of the port logic, recast over the network but returns to the port logic bad or is lost completely.

Positive Change in Generic Loss Counter. FIG. 6(B) illustrates the case in which a good packet originated by the station 4 is lost by the network resulting in a net positive change in the generic loss counter associated with port logic 70. A good packet is generated by station 4 and is detected as exiting port logic 70 over line 56. The generic loss counter for this port is incremented by one. Once injected into the remainder of the network, at some place the packet is corrupted or it is completely lost. Since it does not return good to port logic 70, a net positive change in the generic loss counter results. As shown, an increment is marked within FIG. 5(B) without a corresponding decrement and a net positive change results in the loss counter. Net positive values of the generic loss counter of port logic 70 represent a fault within the remainder network apart from the station 4.

Figure 6C:
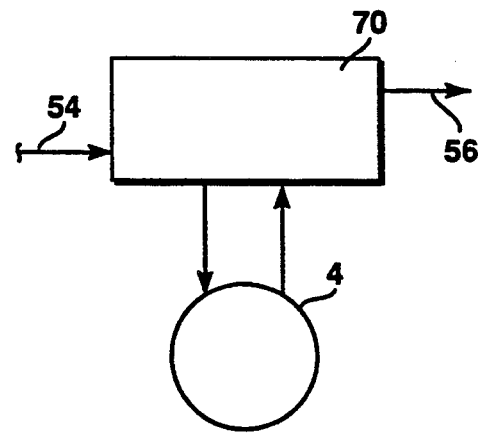
FIG. 6(C) illustrates the case of the present invention generic loss metric embodiment wherein a bad message is generated by the attached station.

No Net Change in Generic Loss Counter. FIG. 6(C) illustrates the case in which a bad or error packet is detected as exiting port logic 70 that originated from the attached station 4. Since the packet is bad, it does not increment the generic loss counter associated with port logic 70. If the packet is later perceived entering the port logic 70 over line 54 the generic loss counter will not be decremented since the packet is in error. If the packet is completely lost it will likewise not be perceived by port 70, so the generic loss counter will similarly not be decremented. No net change will result in the generic loss counter and as shown neither the decrement nor the increment are marked within port logic 70.

Figure 7:
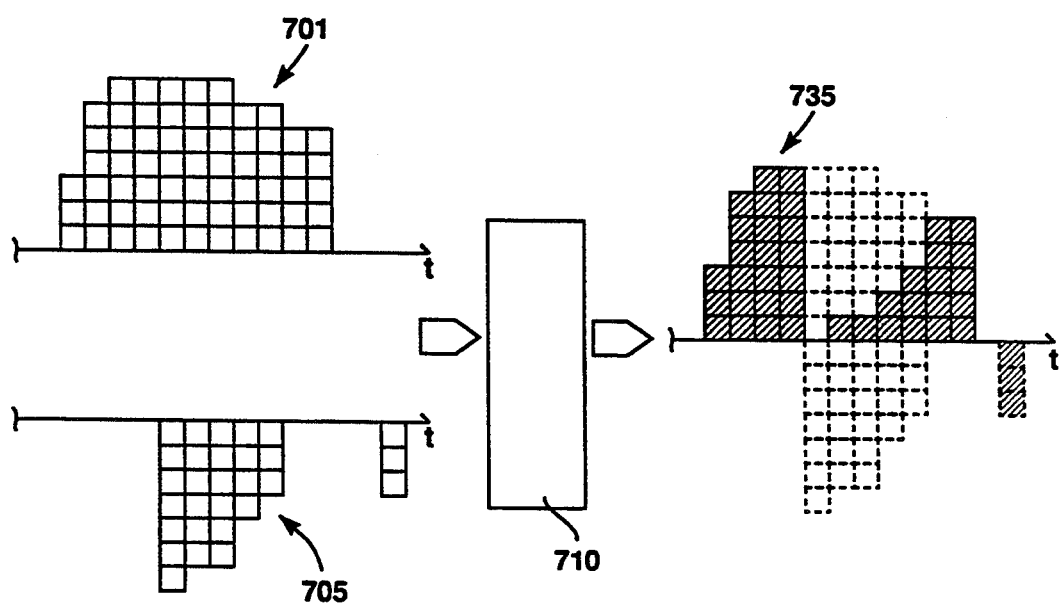
FIG. 7 illustrates summation of the counts of messages lost by the port or its attached station and the counts of messages lost by the network to form the generic loss metric embodiment of the present invention for a given port logic device and association communication station.

FIG. 7 illustrates in graphical form the results of the generic loss metric for a given port logic 70 and attached device 4 for a selected sample interval of time. It is appreciated that for each port logic block (and associated station) of the class of ports within the present invention a separate generic loss metric is generated by the present invention. The graph 701 of FIG. 7 illustrates a history of the net positive changes in the generic loss counter and represents the number of messages that were generated by the station 4 but lost over the remainder of the network for a given time sample inter,,al. In this graph 701 there are 11 discrete time intervals over which the generic loss counter contained net positive results indicating losses caused by the remainder of the network (see FIG. 6(B)). The bottom graph of 705 represents a history of the net negative counts over time of the generic loss counter and illustrates the losses caused by the port 4 over six discrete intervals of time for the same time sample. That is, during these time intervals, the generic loss counter at some point encountered a message that entered the port from the remainder of the network and was lost by the station 4 (see FIG. 5(B)).

However, the histories as shown in graph 701 and 705 are not recorded in the form illustrated by FIG. 7. Because of the manner in which the generic loss counter counts, the histories 701 and 705 are automatically summed, via summation transformation 7 10, in a generic loss metric for port logic 70 which is illustrated as graph 735 (i.e., the highlighted portion is the resultant generic loss metric over the same time interval). Since net negative changes and net positive changes may occur within the single generic loss counter associated with port logic 70 during any given time interval, the counts of histogram 701 and 705 are automatically summed together by the generic loss counter. In other words, the transformation of block 7 10 occurs simultaneously with the net positive and net negative changes of the generic loss counter. However, for purposes of clarity and illustration only, the graphs 701 and 705 are presented separately.

Generic Loss Metric. The generic loss metric 735 of the present invention represents a history of the actual numeric values of the generic loss counter at the end of the discrete time intervals which constitute the metric 735 for a given sample of time. Therefore, it is appreciated that the generic loss metric is a histogram of the results of the generic loss counter for discrete periods of time over a time sample. As seen from FIG. 7, at the leading edge of the generic loss metric 735 there were four time intervals in which the generic loss counter contained a net positive value. During these four time intervals it may be stated that the station 4 (or port logic 70) was operating with less faults as compared to the network, or rather, the network was less efficient at properly communicating packets than the station 4. Following these four time intervals, the count of the generic loss counter was zero. This indicates that the station 4 lost as many packets as the network and therefore station 4 (or port logic 70) operated as effectively as the remainder of the network in general. The following six time intervals are positive indicating the network caused more hulls than the station 4 during this time. Again the generic loss counter reached a count of zero for the next interval. The last interval indicates a net negative count of the generic loss counter. This indicates that for the last time interval sampled, the station 4 (or port logic 70) lost more packets as compared to the remainder of the network in general. This means the station 4 operated less efficiently as compared to the network. It can be seen, generally, from FIG. 7 that according to the generic loss metric 735, the port logic 70 operated more effectively to communicate packets over most of the time intervals than did the rest of the communication network over the time sample.

It is appreciated that the generic loss metric 735 of the present invention may be individually generated and stored by each port logic block 70 as the histogram ("metric") is being created. The metric may be further specified to include or exclude counts for certain frame classes, such as MAC, void, or implementor frames and other frame classes which are similarly defined in the FDDI standard. The generic loss metric for each associated port may be stored in RAM devices (of each port logic block) as an array indexed by the particular time interval and containing a resultant count (in positive and negative values) representing the result of the generic loss counter at the end of each separate time interval. The generic loss metric 735 would then be communicated to the NMM 65 over line 76 (of FIG. 3) when the generic loss metric is requested by a request signal. However, depending on a particular implementation, the generic loss metric 735 may also be compiled and generated originally by the NMM 65. In this case, at the end of each time interval, the result of the generic loss counter is polled by the NMM 65, for each individual port logic block, and a generic loss metric is compiled for each port which represents the history of the generic loss counter for each port. This implementation may be preferred for network systems having limited memory storage for the associated ports but adequate RAM devices for the NMM unit 65. Either of the above implementations are but design choices of the present invention and as such are fully contemplated within the scope of the present invention. Counts of the present invention may also be stored in absolute count form as opposed to sapling count changed as described above.

During diagnostic troubleshooting, a user may utilize the port logic of the present invention to select a particular station, for instance station 4, and may input this information over the user interface devices of the NMS (i.e., the keyboard input 106 or via cursor control 107). The NMS will then instruct individual NMMs to compile or report a histogram of the counts of the generic loss counter for the port associated with the selected device, in this case port logic 70. This histogram of generic loss metric of the present invention is then communicated from the NMM to the NMS and the result of the generic loss metric may be displayed over the display screen 105 in graphical form to the user. The user may then select different time samples to study or may widen or shorten the time interval for each generic loss metric. The user may also reset the generic loss metric for a new time sample. The manner of presenting information to the user may be optimized for a given application or presentation format. It is appreciated, however, that within the present invention, the user has control over the numeric and graphical presentation of the generic loss metric for a given port. Upon a study of the generic loss metric, the user or the NMS automatically may determine how the attached station 4 is performing compared to the remainder of the network. Performance information with respect to attached stations 4 is important to a communications system analyst in determining fault location and isolation.

It is appreciated that the components of each port logic unit used by the present invention in order to increment and decrement the generic loss counter will be described in discussions presented further below with reference to FIG. 9.

Source Address Loss Metric. The generic loss counter for a given port logic unit may be implemented as discussed above but limited to packets originating from a source device that is coupled to the given port logic unit. In such a case, the port logic unit will respond (i.e., will increment or decrement the loss metric) only with respect to messages that originate from the attached station to that given port logic device. In such case, each port logic device will be responsive to messages that originate from different stations because each port logic unit will have a different attached device. For a given port logic unit, this counter is called the source address loss metric or SA loss metric.

In the above case, the port logic 70 unit may contain both a generic loss counter and a SA ("source address") loss counter. Refer back to FIG. 6(A), FIG. 6(B), and FIG. 6(C) for reference. For instance, port logic 70 is pre-loaded with the address of the station 4, its attached station. Under this configuration, upon receiving a packet from station 4, the port logic of port 70 will increment the SA loss counter only if the following conditions are satisfied: (1) the message is of a desired frame class (i.e., not a MAC frame, not a void frame, and not an implementor free); (2) the source address of the message is equal to the address of the attached device which is station 4; (3) the CRC checks good so that the message is not corrupted; and (4) the message is properly terminated. The above conditions basically outline that the received message is good and that it originated from station 4. The message is then recast over the network via line 56. Upon receiving the message back from the rest of the network over line 54, the port logic 70 will decrement the SA loss counter associated with 70 if: (1) the received message is of a desired frame class; (2) the source address of the message is equal to the source address, station 4; (3) the CRC checks good so that the message is not corrupted; and (4) the message is properly terminated.

It is appreciated that if the message does not return from the rest of the network (or returns in error) the SA ("source address") loss counter will contain a net positive result because the decrement function will never take place. If the message returns properly, then the SA loss counter will be decremented and there will be no net positive result. A net positive result of the SA loss counter indicates messages originating from the station 4 that are lost by the network. It is further appreciated that while the SA loss counter is operating with respect to port 70, a separate generic loss counter may also operate in parallel within port 70. In this case the generic loss counter operates with respect to all messages encountered by port 70 while the SA loss counter operates with respect to only those messages originated from the pre-loaded target source address which is the address of station 4. It is appreciated that an SA loss counter of a given port is a source address loss counter wherein the source address happens to be the address of the station attached to the given port.

Single Attached Station Loss Metric. The generic loss metric of a port logic block as described above is the combination of two separate count mechanisms: packets from a port lost by the network (graph 701 of FIG. 7) and packets from the network lost by a port (graph 705 of FIG. 7). Due to generic loss metric decrement/increment counting mechanism described above, it is possible that a no net change condition in the generic loss metric could represent either (1) a properly functioning port/network or (2) an equally poor port-/network. The resultant form of the generic loss metric is represented by graph 735. It is therefore advantageous to have a mechanism that can differentiate the above two different no net change conditions of the generic loss metric. This can be accomplished for the common case of a single attached station.

The source address loss metric represent packets from an attached device lost by the network. In the case for which a single attached station (i.e., the attached device is a single station and not a concentrator, etc.) using a single source address is attached to a port, the source address loss metric will represent packets from the port lost the by the network (in the single attached station case, it is appreciated that port and station become interchangeable terms). In this case, the source address loss metric will contain the same information as represented in graph 701 of the generic loss metric. Therefore, using the generic loss metric and the source address loss metric, it is possible to determine the number of packets from the network lost by a port for the case of a single attached station. The determination of the number of packets from the network lost by a single attached port is referred to as the single attached station loss metric or "SAS" loss metric of the present invention.

Figure 8:
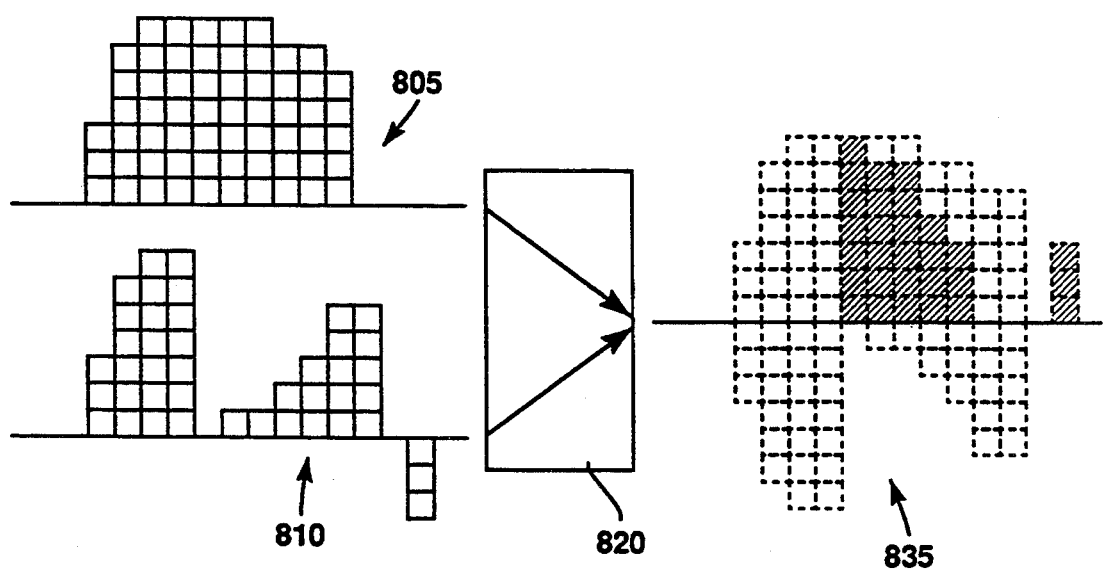
FIG. 8 illustrates a transformation of the present invention wherein the generic loss metric for a given port are added to the negated value of the sum of the losses caused by the network for messages originating from that given port address.

Refer to FIG. 8 which illustrates the SAS loss metric for a given port. A histogram of the values of the SAS loss counter over discrete intervals of time constituting a time sample may be generated. Such a histogram or SAS loss metric is illustrated in FIG. 8 as graph 835 which (like graphs 735) may be implemented in a RAM device as an indexed array of data values. The positive values within the histogram indicate messages that were generated elsewhere in the network and lost or corrupted over the communication link to the single attached station (station 4) attached to this port. This metric is derived from the generic loss metric (810) and the source address loss metric (805) through transformation 820. The lower graph 810 represents a histogram of the generic loss metric that similarly may be implemented as an indexed array count of values within a RAM device. If the generic loss metric 810 is negated and then added to the SA loss metric 805, the resultant graph, illustrated as the shaded portion of 835, indicates the number of packets that were lost due to faults associated with port 70. The present invention negates the generic loss metric 810 and adds that to the SA loss metric 805 within the transformation block 820. The resultant graph 835 is then constructed. Such a transformation 820 may be implemented in hardware using well known circuits such as up/down counters or may be implemented within the NMM or NMS via software instructions. It is appreciated that such histogram 835 can then be displayed on the display device 105 of the NMS for user visualization. By employing such a histogram 835, a user or network system analyst may determine how many frames were lost or erred by a particular single attached station on the network at any given time interval. Such information may be critical if the device is adversely affecting other critical communication devices, such as a router or file server.

Target Source Address Loss Metric. The generic loss counter for a given group of port logic units may be implemented as discussed above but limited to packets originating from a particular target source device and having a particular and pre-loaded source address. This embodiment of the present invention is called the targeted source address loss metric ("TSA loss metric") embodiment because the loss metric generated is no longer "generic" as to any messages over the network, but rather is limited to only messages originating from a particular target source address (i.e., messages that contain the particular target source address). In other words, the loss counter for a given port logic unit will increment and decrement according to the above cases, but only for messages containing a particular target source address. Since all packets originating from the target source will be marked with that source address within the message dataframe, the circuitry of the target source address loss metric of the present invention must be able to detect messages that contain the particular target source address. This circuitry will be explained further in discussions to follow with reference to FIG. 9.

With reference to the targeted source address loss metric, each of the loss counters within a group of port logic units must be pre-loaded with the target source address of interest. This is accomplished by the NMM 65 and may also include functions of the NMS. For instance, the user via the NMS will input a particular target address via the keyboard input device 106. The target address corresponds to an attached station or device under analysis. The target address is then communicated from the NMS to individual NMMs which then, via the management bus 67, communicate this address to each of the attached ports on the concentrators. The NMS then communicates the target address to all concentrators of the ring network so that all ports of the present invention will be pre-loaded with the target address. From this point on, the loss counters of the ports will increment or decrement only with respect to message packets containing the pre-loaded target source address.

Refer to FIG. 3. For instance, port logic 70 and all other ports of the network, are pre-loaded with the address of the station 6. Under tiffs configuration, upon receiving a packet from station 6 via line 54, the port logic of port 70 will decrement its TSA loss counter only if the following conditions are satisfied: (1) the message is of a desired frame class; (2) the source address of the message is equal to the target source address (i.e., the message originated from station 6); (3) the CRC checks good so that the message is not corrupted; and (4) the message is terminated without errors. The above conditions basically outline that the received message is good and that it originated from station 6. The message is then recast to the attached station via lines 91. Upon receiving the message back from the attached station 4, the port logic 70 will increment the TSA loss counter associated with port 70 if: (1) the received message is of a desired frame class; (2) the source address of the message is equal to the target address (i.e., the message originated from station 6); (3) the CRC checks good so that the message is not corrupted; and (4) the message is terminated without errors.

It is appreciated that if the message does not return from station 4 (or returns in error) the TSA loss counter will contain a net negative result because the increment function will never take place. If the message returns properly, then the TSA loss counter for port 70 will be incremented and there will be no net negative result. A net negative result of the TSA loss counter for port 70 indicates messages originating from the station 6 that are lost by the attached station 4 or the associated communication links 91. It is further appreciated that while the TSA loss counter is operating with respect to port 70, a separate generic loss counter and separate SA loss counter may also operate in parallel within port 70. In this case the generic loss counter operates with respect to all messages encountered by port 70 while the SA loss counter operates with respect to only those messages that originated from station 4 and the TSA loss counter is responsive to those message that originate from station 6.

Configuration of Port Logic of the Present Invention

Figure 9:
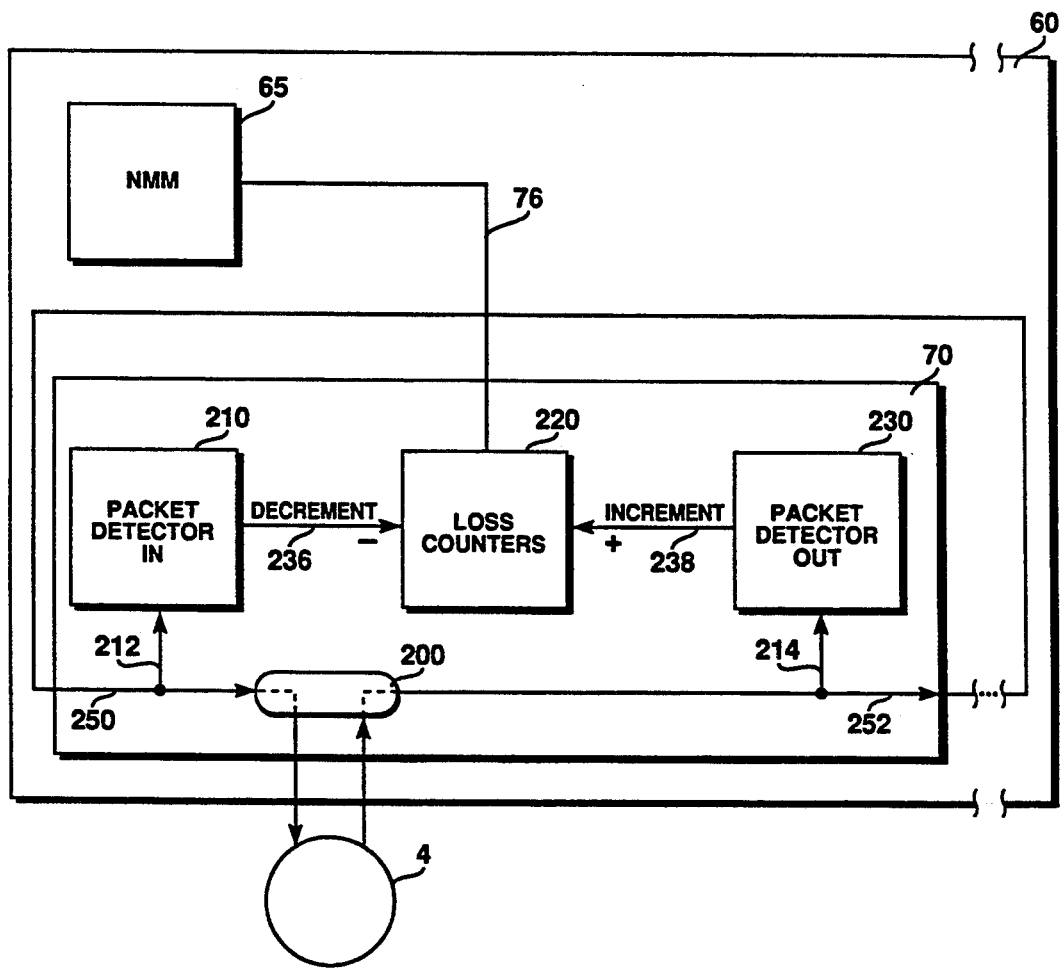
FIG. 9 represents the block diagram of the components of the present invention loss counter (generic or source address) that exist within the port logic devices of the communication network.

FIG. 9 illustrates the port logic required to implement the generic loss metric, the SA loss metric, and the targeted source address loss metrics for an individual port unit. The SAS loss metric may then be derived from the generic loss metric and the source address loss metric as described above. The generic loss metric implementation of the present invention is first described.

Generic Loss Metric. The port logic 70 of the preferred embodiment of the present invention that realizes the generic loss metric is illustrated in more detail with reference to FIG. 9. It is appreciated port logic 70 is illustrated for exemplary purposes, and the below discussion concerns circuit elements that are realized with each separate port logic block, such as 72, 74, etc. FIG. 9 illustrates a portion of the concentrator 60 containing port logic 70 as well as the NMM 65 and the interconnection 76 over the management bus. Dataframes from the network 15 flow into the port logic (switching element) 70 for associated station 4 via line 250. The dataframes are sampled by the present invention and a copy of the dataframes is sent via line 212 to the packet detector (in) 210 without interruption of the dataflow over line 250. The dataframes then enter the physical interface layer (PHY) and physical media drivers (PMD) circuitry 200 of port logic 70 and then are transferred to receiving station 4. The dataframe packets are then analyzed by the station 4 to determine if it is a destination port or if it is the origination port. The station 4 will then repeat the message onto the network, if necessary.

The message packets then travel from station 4 back to the block 200 and via line 252 they flow out of the port logic switching element 70 to the adjacent port logic 72 (not shown in FIG. 9). As the dataframes flow in line 252, they are sampled and a copy is sent via line 214 to the packet detector (out) 230 without interruption of the dataflow over line 252. The messages are relayed to the remainder of the network via line 252.

The detector in block 210 of FIG. 9 is a hardware circuit block that resides within the switching logic of the port logic 70. The packet detector 210 for operation of the generic loss metric analyzes the dataframes sent via line 212 to determine if the packets are good and of a desired frame class; this mainly entails performing checks on the frame class and checking the CRC (cyclical redundancy checksum) field of the packet to determine if the packet is corrupted or not. This process is a well known process and any well known CRC procedure may be implemented for this step. Since the port logic blocks of the ports of the concentrator 60 are synchronous within the FDDI network standard, the clocking data signals are recovered from the physical interface layer blocks 200 and are relayed to the packet detector logic 210. The packet detector 210 uses the recovered clock signal to interpret the dataframes from line 212. This clocking signal is used in the CRC check process. Other checks are also determined at packet detector block 210 to determine if the data is good, such as checking if the message is terminated without errors. When a good message is detected, the detector 210 of the present invention generates a decrement signal over line 236 in order to decrement the count of loss counter 220 which is a simple up/down counter, or two separate absolute counters, and may be implemented in hardware as a counter or via software as a memory register or registers. This value within 220 is the generic loss counter.

Data flows back from the station 4 over line 252 and a copy flows to line 214 to the packet detector out logic 230. The detector (out) block 230 is a hardware circuit block that resides within the switching logic of the port logic 70. The packet detector 230 will analyze the dataframes sent via line 214 to determine if the message is good. The methodology and circuitry utilized to perform this function is analogous to that utilized with respect to packet detector (in) block 210. Since the port logic blocks of the ports of the concentrator 60 of the present invention are synchronous within the FDDI network standard, the clocking data signals are recovered from the physical interface layer blocks 200 and are relayed to the packet detector logic 230. The packet detector 230 uses the recovered clock signal to interpret the dataframes from line 214. When the message is determined to be good, the packet detector block 230 generates an increment signal over line 238 in order to increment the value within the generic loss counter 220.

At any time during the above operation, the NMM 65 of FIG. 9 may read the current count of the generic loss counter 220 over line 76 for any of the attached ports. This value may be recorded as pan of a histogram or generic loss metric which is a history of the generic loss counter 220 for a given set of time intervals over a particular time sample. It is appreciated that the above can occur within each port logic block of each port of the concentrator 60 of the present invention or for any given concentrator. Each port logic block (i.e., block 72, 74, etc.) contains an individual packet detector (in) 210, an individual loss counter 220 and an individual packet detector (out) 230. Assuming that concentrator 60 has at least three stations and ports, there will be at least three loss counters that are updated according to the preferred embodiment of the present invention. It is appreciated that according to the physical configurations of the FDDI network, the ports and port logic (switching units) of the present invention reside within module units that themselves reside in the concentrator chassis and, therefore, to the communication bus as well.

According to the logic as illustrated in FIG. 9, if a message recast by port 70 is lost or corrupted by the network, the generic loss counter 220 for that particular port will have a net positive change. If the station 4 corrupts a particular message sent from the network, then the generic loss counter 220 for port 7:0 will have a net negative change. If the port 70 and station 4 are performing as good as the network then the generic loss counter 220 for port 70 will remain zero. If the port 70 and station 4 are performing worse than the rest of the network, then the generic loss counter 220 will contain some negative counter number. If the port 70 and station 4 are performing better than the network then the generic loss counter 220 will contain a positive number. The NMM 65 of the present invention may examine the current state of the generic loss counter 220 to construct a generic loss metric (histogram) within memory. By examining the NMM 65 of the concentrator 65, a fault detection system (i.e., operating on the NMS) can quickly determine the relative performance of a port and attached station by examining the generic loss metric for that port and its attached station. By examining the generic loss metric for all ports, an NMS may determine the location of faults within the system (see discussions below). Using such information, the fault detection or isolation system can better isolate faulty transmission lines and/or faulty stations or nodes within the overall ring based communication network.

It is fully appreciated that the present invention may be modified wherein the decrement and increment functions performed by the packet detectors 210 and 230 may be switched in that the detector in 210 increments the loss counter 220 and the packet detector 230 decrements the loss counter with all other appropriate changes in sign that are required. The only change in such embodiment would be an alteration in the sign of the resultant count in the loss counters and loss metric for each port. It is appreciated that such a change in a counting scheme is fully within the scope and spirit of the present invention and may be viewed as a proper equivalent thereto according to one skilled in the art.

Figure 10:
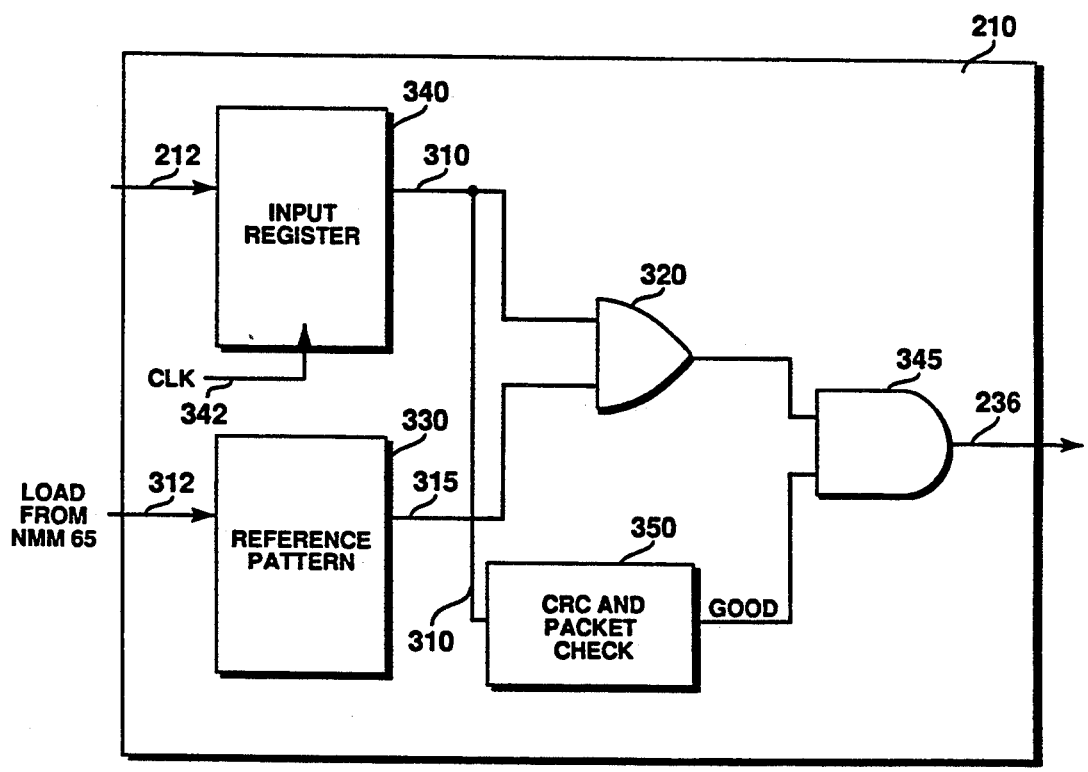
FIG. 10 represents the hardware components of the message packet detectors of the present invention that are utilized to realize the generic loss metric embodiment and source address loss metric embodiment of the present invention.

It is appreciated that the hardware circuitry to implement the packet detectors 210 and 230 of the generic loss metric implementation of the present invention may employ any of the well known CRC functions. Further, the detectors may be pre-loaded with the standard header block for all messages of interest that are recast over the network. In such a way, the detectors may scan the incoming messages for this common header in order to recognize the presence of a message. Such a scanning mechanism may be implemented as illustrated by FIG. 10 which shows the detail of a detector 210. A header information block may be loaded into the reference pattern memory 330 from the NMM 65. The input data stream to port 70 is illustrated as line 212 which feeds an input buffer 340. The contents of these two buffer memories are feed to a comparator 320. The reference buffer 330 may be implemented in compatible hardware such as a ROM, PROM, EEPROM or similar long term memory storage unit. The buffer 340 is implemented using RAM devices.

With reference to FIG. 10, the comparator 320 will pulse upon detection of a message header over line 212. The comparator 320 output is fed to the input of an AND gate 345. The other input of the AND gate 345 receives the output of a unit 350 that performs the CRC function in order to test if the entering message is good. The CRC check block 350 receives input 310 from the input packet stream from buffer 340. The AND gate 345 pulses line 236 to decrement the loss counter 220 only if the detected packet is a message and the packet is good. It is to be appreciated that the above illustration is but one manner of implementation for the packet detectors used for the generic loss metric embodiment of the present invention. Alternative and well known CRC methods may be employed. It is father appreciated that the packet detector (out) 230 may be implemented analogous to the packet detector (in) 210 however its input register is reads messages flowing out of line 214 (i.e., exiting messages) and its comparator will pulse line 238 to increment the generic loss counter 220 when appropriate. The reference pattern of packet detector 230 is the same as that for packet detector 210.

The clock 342 is retrieved from the message stream by the port logic according the above referenced FDDI standard. Since the port switching logic of port logic 70 of the present invention is synchronous within the FDDI network standard, the port dataframes traveling into the logic block 210 via line 212 may be interpreted and stored into the input register 340. It is appreciated that the clocking signals of the data flow of the information represented within communication channel 2 12 have been recovered from either the physical layer interface layer 200 for the port logic associated with the illustrated port, or, the clocking signals have been recovered from the physical layer interface logic associated with an adjacent port. Since the port logic blocks are almost all synchronous within the FDDI standard, recovery of the clocking signals may be achieved readily. It is further appreciated that the data stream entering the input register 340 via line 212 may be either parallel or serial in nature according to the present invention. However, if the data stream is serial, an input clocking pulse 342 may be used to time or clock the data bits as they enter the register. Clock 342 may also be used to latch in bytes or words of the dataframes if a parallel transmission scheme is adopted. In either case the clocking signals at 342 are based on the recovered clocking signals from the physical layer interface logic.

Targeted Source Address Loss Metric. With reference back to FIG. 9, the port logic of the present invention may also be implemented in order to generate a targeted source address loss metric as discussed above. In this case, port logic 70 (and ports 72 and 74) increments or decrements the port's TSA loss counter 220 only upon detection of messages having a particular and pre-loaded target source address which may be any arbitrary network address (not necessarily the source address of the associated station). In such an implementation, the packet detectors 210 and 230 contain further logic in order to recognize the target source address within the dataframes of the recast messages. According to the present invention, a second counter called the source address loss counter (SA loss counter) may be implemented within 220 along with or in place of the generic loss counter (both counters are typically separately maintained). In such embodiment having both counters, the line 236 contains separate decrement signals, one for each counter within unit 220 and line 238 contains separate increments lines, one for each counter within unit 220. In an alternative implementation of the present invention only one counter will exist within the 220. In such embodiment, if no target source address is pre-loaded into the packet detectors 210 and 230 then the counter 220 will count the generic loss measure by default. If an arbitrary target source address is preloaded into the packet detectors 210 and 230 then the counter unit 220 will measure the target source address loss metric. All of the above implementations are within the scope of the present invention.

FIG. 10 illustrates the port logic circuitry which may be utilized by the target source address loss metric embodiment of the present invention which is in addition to the logic required for the generic loss metric embodiment as discussed above. FIG. 10 illustrates packet detector (in) 210 in more detail. According to FIG. 10, the NMM 65 may pre-load a target source address over line 213 into a reference pattern buffer which is configured to locate the source address portion of the message headers (i.e., the dataframe headers that contain the source address of the message). Messages recast over the network over line 212 are examined by the input buffer 340 and sent via line 310 to be compared to the input target address of block 330 by comparator 320. When the recast message contains the target source address within its source address header, the comparator 320 generates an output signal. The output of the comparator 320 is fed to one input of AND gate 345.

The message packet over line 310 is also examined by block 350 which performs: (1) a CRC check on the message packet; (2) a check to make sure the message packet is of a desired frame class; and (3) a check that there is termination without errors. If all of the above conditions are met, the block 350 generates a "good" signal which is fed to the other input of the AND gate 345. The AND gate 345 will pulse the decrement line 236 to decrement the target source address loss counter 220 only if the input message packet contained the target source address as its source address and the message was also good. It is appreciated that the packet detector (out) 230 may be implemented analogous to the packet detector (in) 210 (according to the target source address loss metric embodiment of the present invention) however its input register reads messages flowing out of line 214 and its comparator will pulse line 238 to increment the target source address loss counter 220. The reference pattern (i.e., the pre-loaded target source address) of packet detector (out) 230 is the same as that for packet detector (in) 210 and is loaded likewise by the NMM 65.

With reference to FIG. 10, as the unknown dataframes are input via line 212, enough bits of data are stored within the input register 340 in order to capture an entire target source address, if present. Assuming a target source address represents more than three words (start delimiter, address bytes, end delimiter) then these words of data are accepted into the input register. The data of the input register 310 is then compared (bit by bit) or (word by word) to the target source address stored in the reference buffer 330. The comparison is accomplished via a comparator 320 that can be a bit comparator or a multiple word comparator. Such comparators are well known in the art of digital and signal processing electronics and any of such well known comparators, or similar logic, may be employed effectively within the present invention. It is appreciated that the comparator 320 of the present invention compares the data stream 310 from the input register or buffer 340 against the start delimiter of the message header of the message dataframe as stored within the reference buffer 330 and supplied to the comparator via line 315. If such delimiter is located, the comparator 320 then compares the next frame of the unknown pattern against the source address of the reference pattern. If the source address of the unknown packet matches the target address the comparator will generate an output signal.

It is appreciated that if the packet detector logic (210, 220, 230) of port logic unit 70 was placed within the station 4, the detection logic would be susceptible to faults associated with the station 4. That is, faults associated with the station 4 may cause the detection logic (therein situated) to give false readings. Further, by situating the packet detector units in the station 4, the detector units 210 and 230 will not be able to indicate faults associated with the transmission lines that couple the station 4 to the port logic 70. This is the case because the packet detector units may indicate that the packet was detected leaving station 4 (i.e., by updating the loss counter) but the transmission lines of the station's port may then lose the packet via a transmission fault of the same port. In this case, inspection of the lost counter would not yield useful information. Also, by placing the packet detection units within the station, extra communication packets would have to be generated by the station 4 to the NMM 65 of the associated concentrator 60 each time the loss counter was read by the NMM. Therefore, the present invention does not place the packet detectors within the station, but rather, advantageously places the packet detection blocks 210 and 230 within the port logic (switching elements) 70 associated with the concentrator 60. By so doing, the detection units 210 and 230 are (1) not susceptible to station faults, (2) provide useful information with respect to transmission line faults and station faults, and (3) provide a direct route for loss metric communication with the NMM 65 of the concentrator without adding communication packets onto the network.

Source Address Loss Metric. The implementation for the source address loss metric is similar to the targeted source address loss metric, except a particular port generating a SA loss metric has its reference buffer 330 loaded with the address of its attached station. The SA loss metric measures the number of packets lost by the network that originated from the source address device. For example, port logic 70 would have the address for station 4 loaded into the reference buffer 330. The port would then only respond to messages containing the source address of station 4. It is appreciated that a separate counter mechanism is provided in each port block to separately count the SA loss metric as well as the targeted loss metrics and the generic loss metrics.

Single Attached Station Loss Metric. The single attached station loss metric of the present invention is derived from the difference between the source address loss metric and the generic loss metric. The resulting SAS loss metric is representative of the number of packets generated by the network and lost at the single attached station. The SAS loss metric of the present invention could also be implemented analogously to the SA loss counter except that the SAS counter would respond (i.e., increment/decrement) only to packets with a source address not from the address used in the SA counter scheme (i.e., not from the singled attached station).

Generic Loss Metric Fault Detection and Location

Figure 11:
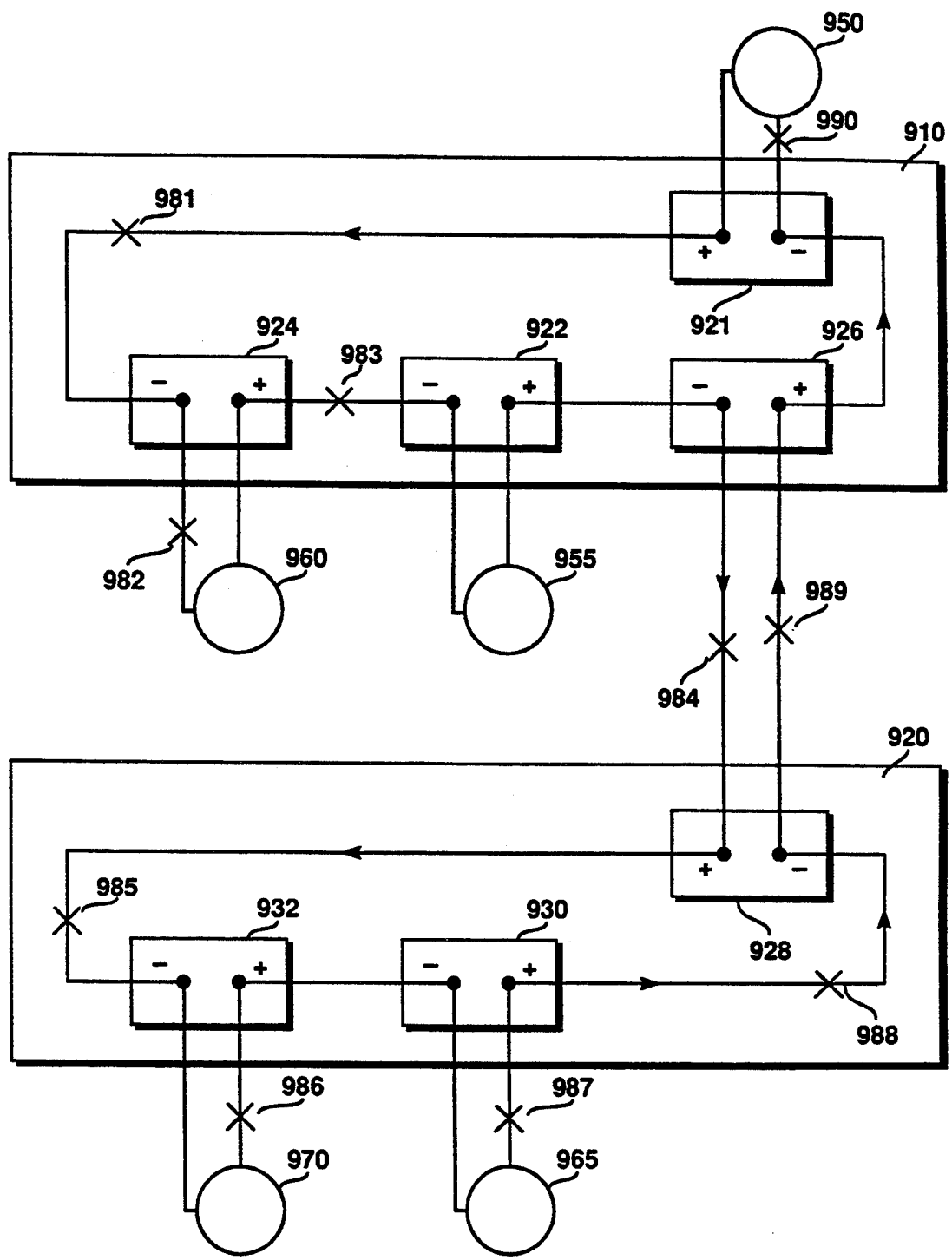
FIG. 11 illustrates a representative ring based communication system having port logic devices of the present invention to illustrate the single fault detection and location capabilities of the generic loss metric embodiment of the present invention.

Refer to FIG. 11 which illustrates an exemplary ring communication network. The following is an example of a fault isolation procedure of the present invention that utilizes the generic loss metric of each port within the network of FIG. 11 to detect and locate a single fault that may be in one of ten possible locations in the network (981–990). The network of FIG. 11 contains two concentrators 910 and 920 which are coupled together via port logic units 926 and 928. There are seven ports total (and therefore seven generic loss metrics) and five single attached stations within the network. It is appreciated that while the generic loss metric may be utilized for detection and location of multiple simultaneous faults within the network of FIG. 11, the fault detection procedure of the present invention generic loss metric as described below is most accurate in locating faults within the single fault model. According to FIG. 11, assume that the five stations of the network generate packets according to the data of Table I below. The column indicating packets that return bad or do not return are those packets that are corrupted or lost due to the single fault within the network.

TABLE I

| Station | Packets Per Second Generated | Packets that Return Bad Or Do Not Return |
|---|---|---|
| 950 | 800 | 90 |
| 960 | 80 | 4 |
| 955 | 150 | 15 |
| 970 | 2 | 1 |
| 965 | 1000 | 250 |

Depending on the location of the single fault within the ten possible locations (981–990), Table 2 (below) illustrates the contents of the generic loss metrics for each of the 7 ports for each single fault. Only one fault is present at any given time within the network. It is appreciated that these results may be read by each of the NMMs of each concentrator and then relayed to the NMS of the network (not shown in FIG. 11). The NMS may then display the generic loss metric values for each of the seven ports onto its display screen 105. Therefore, the information and format of Table 2 may be construed as a visualization of the generic loss metric for each of the seven ports of the network of FIG. 11.

within the network. Procedure 1; if all of the generic loss metrics for a particular concentrator are positive, then the fault lies in an unmanaged point within that concentrator. An unmanaged point would be a point between two ports having generic loss counters. This could be a transmission line coupling two ports having generic loss counters, or could be a port not having a generic loss counter located between two ports having generic loss counters. A port not having a generic loss counter is an unmanaged port. Procedure 2; the port that contains a negative generic loss metric value is losing packets within its attached station or device (which could be a concentrator). Procedure 3; a port with a positive loss metric is generating packets that are being lost or corrupted by the rest of the network. Using the above procedures and examining the generic loss metrics for all seven ports, a network administrator, or the network itself, may determine the location of a single network fault. Procedure 4; if there is a single fault within the network, the number indicated by the generic loss metric will accurately specify the number of packets lost over the network for a given port or will specify the number of packets lost by the attached station for a given port (depending on the sign of the resultant value). Other procedures; positive values of the generic loss metric for a particular port indicate messages lost by the network that originated from the particular port and negative numbers represents packets lost by the particular port that originated from ports of the remainder of the network. Two ports that couple together concentrators each having negative generic loss counts indicate that the transmission link physically coupling the two ports is faulty. The following discussion illustrates specific examples of single fault locations and the resulting generic loss metrics of the present invention for the seven ports of FIG. 11 for each of the ten single fault conditions.

With reference to FIG. 11, assume a single fault within the network exists at location 981 on the transmission line between port 921 and port 924. This is an unmanaged point. The generic loss counters of all the ports of concentrator 910 are positive as Table 2 indi-

TABLE 2

| GENERIC LOSS METRIC VALUES | | | | | | | |
|---|---|---|---|---|---|---|---|
| Fault at 981 | | | | Fault at 982 | | | |
| Port 921 | +90 | Port 928 | −251 | Port 921 | +90 | Port 928 | −251 |
| Port 924 | +4 | Port 932 | +1 | Port 924 | −356 | Port 932 | +1 |
| Port 922 | +15 | Port 930 | +250 | Port 922 | +15 | Port 930 | +250 |
| Port 926 | +251 | | | Port 926 | +251 | | |
| Fault at 983 | | | | Fault at 984 | | | |
| Port 921 | +90 | Port 928 | −251 | Port 921 | +90 | Port 928 | −251 |
| Port 924 | +4 | Port 932 | +1 | Port 924 | +4 | Port 932 | +1 |
| Port 922 | +15 | Port 930 | +250 | Port 922 | +15 | Port 930 | +250 |
| Port 926 | +251 | | | Port 926 | −109 | | |
| Fault at 985 | | | | Fault at 986 | | | |
| Port 921 | +90 | Port 928 | +109 | Port 921 | +90 | Port 928 | +109 |
| Port 924 | +4 | Port 932 | +1 | Port 924 | +4 | Port 932 | −359 |
| Port 922 | +15 | Port 930 | +250 | Port 922 | +15 | Port 930 | +250 |
| Port 926 | −109 | | | Port 926 | −109 | | |
| Fault at 987 | | | | Fault at 988 | | | |
| Port 921 | +90 | Port 928 | +109 | Part 921 | +90 | Port 928 | +109 |
| Port 924 | +4 | Port 932 | +1 | Port 924 | +4 | Port 932 | +1 |
| Port 922 | +15 | Port 930 | −110 | Port 922 | +15 | Port 930 | +250 |
| Port 926 | −109 | | | Port 926 | −109 | | |
| Fault 989 | | | | Fault at 990 | | | |
| port 921 | +90 | Port 928 | −251 | Port 921 | −270 | Port 928 | −251 |
| Port 924 | +4 | Port 932 | +1 | Port 924 | +4 | Port 932 | +1 |
| Port 922 | +15 | Port 930 | +250 | Port 922 | +15 | Port 930 | +250 |
| Port 926 | −109 | | | Port 926 | +251 | | |

Using the results of Table 2 for a particular single fault location, the following procedure of the present invention may be followed in order to locate the single fault cates. This means that the concentrator (and not the managed ports of concentrator 910) lost or corrupted messages generated by the individual ports. For instance, port 921 generated 800 messages and only received 7 10 back as good. Therefore, the other 90 messages never decremented the loss counter associated with port 921 and thus the loss counter contains a net positive value of 90 which were lost or corrupted. The same is true for the other generic loss counters of concentrator 910. Since all these values are positive within concentrator 910, the fault must be located within concentrator 910 at an unmanaged point. Port 926 couples with concentrator 920 and its positive count of 251 indicates that the port generated 251 more messages than it received back (i.e., the messages were generated from the stations of concentrator 920). With reference to the loss counters of concentrator 920, the generic loss counter for port 928 is −251. This represents packets lost to the attached device of port 928 (which is concentrator 910) that were generated by the remainder of the network (i.e., from ports of concentrator 920). Concentrator 910 lost 251 packets that were not internally generated. Of the 251 lost by concentrator 910, 250 packets were from port 930 and 1 packet was from port 932 (both of concentrator 920). The value is negative indicating that the location is managed with respect to port 928, this is true because the concentrator 910 (containing the fault) is a managed location with respect to the port 928. By using the present invention to examine the negative generic loss metric of port 928 and the all positive counts of the ports of concentrator 910, one can determine that the fault is (1) within concentrator 910 (2) at an unmanaged location within that concentrator. Also, since the loss metrics of concentrator 920 sum to zero, the fault is not located within an unmanaged point of concentrator 920.

Assuming a single fault at location 982, the loss counter values are the same for the port of concentrator 920 as above. However, since the location of 982 is managed, the generic loss metric for port 924 indicates a value of −356. This indicates that port 924 is losing 356 packets that originate from the remainder of the network. By examining the generic loss metric for the seven ports of the present invention, one can determine (1) that the fault lies within concentrator 910 because the port within concentrator 920 that couples to concentrator 910 is negative and other ports within concentrator 920 are positive and (2) that the fault is associated with port 924 because its counter is negative, it contains a single attached station, and no other loss counts are negative within the ports of concentrator 910.

Assuming a single fault at location 983, this case is similar to the fault at location 981 in that the fault lies within concentrator 910 at an unmanaged location. For fault 983, the results of the generic loss metrics for all seven ports are the same as for fault 981. Assuming the single fault is at location 984 within the transmission line between the two concentrators, according to port 926, the fault lies within an attached station (i.e., concentrator 920). Its count value is then −109 and represents the number of packets generated by the remainder of the network (i.e., ports 921, 924, and 922) that are lost by port 926. According to port 928 the fault lies within its attached station (concentrator 910). Its generic loss counter is −251 and represents the packets lost by port 928 that were generated by the remainder of the network (i.e., ports 930 and 932). Therefore, examining the generic loss metrics for these seven ports within the present invention allows one to determine (1) the fault lies in the communication pathway between the two concentrators because both ports that couple the concentrators have negative loss counters and the remainder of the ports have positive values. The same is true for the single fault at location 989 which is an analogous situation.

Assuming a fault at location 985, this is at an unmanaged location of concentrator 920. The generic loss metric values for the ports of concentrator 920 are therefore all positive indicative of this case. The value for port 932 is +1 indicating that it transmitted one more packet onto the network compared to the number it received back. The value for the port 926 is −109 indicating that attached station, concentrator 920, lost 109 packets that were generated by the remainder of the network (i.e., by the other ports of concentrator 910). The negative value associated with port 926 and the positive values for the remainder of the ports of concentrator 910 indicate that the fault is on concentrator 920. By examining the generic loss metrics, one may determine (1) that the fault is at an unmanaged location (2) within concentrator 920. The same is trite for the single fault 988 which is at an unmanaged point within concentrator 920.

Assuming the fault at location 986 which is a managed point within concentrator 920. All the generic loss counts of the ports of concentrator 910 are therefore positive except for the port 926 coupling concentrator 920. By the above, it is indicated that the fault must be within concentrator 920. The large negative value associated with port 932, i.e., −359, indicates that this port is losing 359 packets that originated from the remainder ports of the network (i.e., ports 928 and 930). Since the generic loss metrics of the other ports of concentrator 920 are positive, the fault must lie within the port 932 in a managed position. The same is true for the single fault of point 987 in that an examination of the generic loss counter for the ports of concentrator 910 indicate that the loss is within concentrator 920. The large negative count associated with port 930, i.e., −110, indicates that 110 packets generated by the remainder of the network (i.e., ports 928 and 932) are being lost by port 930. Since the other ports within concentrator 920 are positive, the port 930 must be associated with the fault. It is appreciated that the generic loss count for port 926 is −109 representing that this port (via concentrator 920) is losing 109 packets that are generated by the remainder of the network (i.e., by ports 924, 922, and 921).

From the above, it can be appreciated that a network administrator or an NMS procedure having access to the generic loss metric values (over a given time sample) for all the ports of a network may determine very accurate and vital information regarding the location and detection of single communication faults within the ting communication network by employing the present invention. By interfacing with a NMS (via a keyboard 106, mouse 107 and screen 105 functions) a network administrator or an NMS procedure may determine that a fault exists within an unmanaged port within the network if all of the generic loss counters for a concentrator are positive. If one of the generic loss counters is negative then this points to the direction of the fault. If the negative port has a single attached station then that station is faulty. If the negative port has an attached concentrator than a station or transmission line within that concentrator is faulty. Once the negative port is tracked down that couples with a single station, that device may be wrapped from the communication network for fault isolation. Further, if loss metrics for two ports that couple each other (i.e., between two concentrators) are both negative, then the fault must exists between the transmission cable. It is appreciated that while the above functionality of the present invention is particularly accurate and useful for locating and detection single faults within the network, it may be used, with decreased accuracy, for detecting and locating multiple faults.

It is appreciated that some procedures may be utilized to locate multiple faults using the generic loss counters of the present invention. First, ports with most faults have a negative generic loss counter. Second, ports with least faults may have a positive or a negative generic loss value. Third, ports not causing faults but having their packets lost or corrupted will have positive values of their generic loss counters representative of the number of packets lost. If there is an equal distribution of faults then there may be a situation when no changes in the metric will be perceived.

Multiple Fault Conditions (Targeted Source Address Loss Counter)

Figure 12:
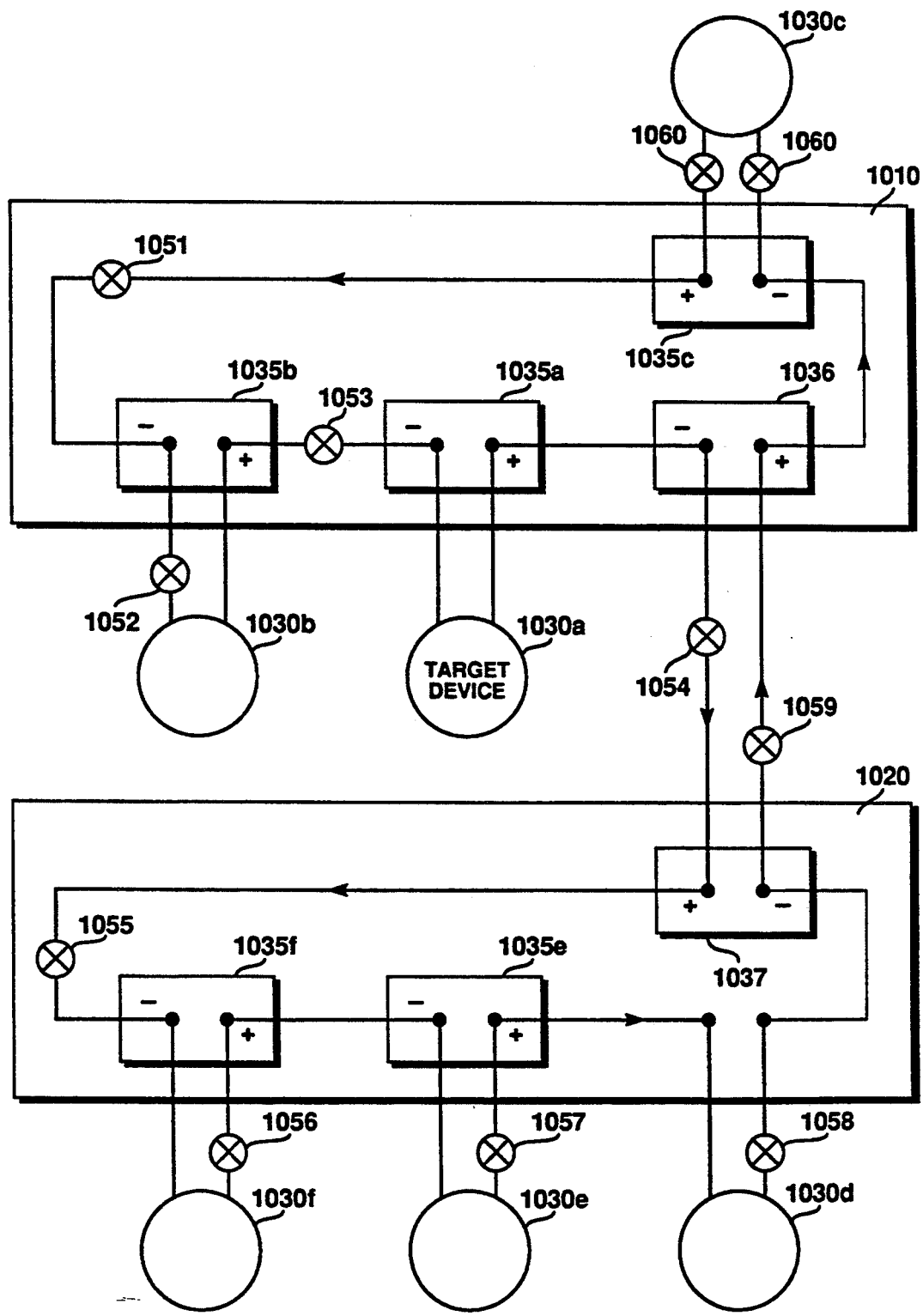
FIG. 12 illustrates a representative ring based communication system having port logic devices of the present invention to illustrate the multiple fault detection and location capabilities of the source address loss metric embodiment of the present invention.

FIG. 12 illustrates an exemplary ting communication network. By employing the target source address ("TSA") loss metric techniques of the present invention as described above, the present invention may be utilized to determine the number of packets that originate from a particular target source address and are lost or corrupted by a particular port or attached station. Using such information, the present invention may locate multiple faults. In operation, a user or the network will input a particular target source address of interest. According to this example, the target source address corresponds to the address of the device 1030a that is coupled to port 1035a. This target device 1030a may be a critical file server that needs to be monitored. The NMS will input or automatically load or communicate this address to the NMMs of all the concentrators of the network, i.e., to the NMMs of both concentrators 1010 and 1020 of FIG. 12. The NMMs will then transmit this target source address over their management bus to all of the port logic blocks of the network (1035a–1035f, 1036 and 1037). Each port logic block then pre-loads this target source address into their respective reference buffer 330 (see FIG. 10). After the target source address is pre-loaded, the increment and decrement functions of the targeted source address loss counters 220 will only be active for messages that originate from the target device 1030a.

After the TSA loss counters 220 have had an opportunity to sample the communication traffic over the network, the results of the targeted source address loss counters are transmitted from each port to the associated NMM within the concentrator of the port. This information is then forwarded by the NMMs to the NMS for visualization and display to a user over screen 105 or analysis by an NMS procedure. According to Table 3, packets originating from the target device 1030a are lost at the following indicated fault points of FIG. 12. Table 3 illustrates the number of these packets lost (or corrupted) at the appropriate fault location. In total, 450 packets are lost at these fault positions.

TABLE 3

| Fault | Packets Lost | Fault | Packets Lost |
| --- | --- | --- | --- |
| 1051 | 9 | 1052 | 4 |
| 1053 | 2 | 1054 | 5 |
| 1055 | 1 | 1056 | 4 |
| 1057 | 150 | 1058 | 50 |
| 1059 | 25 | 1060 | 200 |

It is appreciated that the target device 1030a of FIG. 12 generates 4500 packets total and of these 450 packets never return or return corrupted and bad. The packets from the target device 1030a are lost at 10 different locations within the network. For instance, at location 1056, 4 packets are lost and at fault 1057, 150 packets are lost (as shown by Table 3). Table 4 (below) illustrates the state of the targeted source address loss metrics for each of the seven ports of the network after a sample period of time is taken.

TABLE 4

| Concentrator 1010 | | Concentrator 1020 | |
| --- | --- | --- | --- |
| Port 1035c | −200 | Port 1037 | +205 |
| Port 1035b | −4 | Port 1035f | −4 |
| Port 1035a | +450 | Port 1035e | −150 |
| Port 1036 | −235 | | |

According to Table 4 (above) the targeted source address loss counter for the port 1035a of the target device is +450 indicating that it generated and recast 450 more packets over the network than it received back from the network. These packets having the target device source address were lost at ten different locations throughout the network (1051–1060). Specifically, the target device 1030a generated 4500 messages which past the increment packet detector 230 of the port logic 1035a. Of these 4500, only 4050 returned passing the decrement packet detector 210 of the port logic 1035a. The result was a positive 450 in the targeted source address loss counter 220. The targeted source address loss counter (TSA loss counter) for port 1035c indicates a value of −200 indicating that it lost or corrupted 200 packets (i.e., it received 200 more packets than it transmitted back onto the rest of the network). The TSA loss counter for port 1035b is −4 indicating that it lost or corrupted 4 of the packets with the target source address. The last port within concentrator 1010 is port 1036 which couples the concentrator 1020. The TSA loss counter for port 1036 is −235 indicating that the concentrator 1020 as a whole (including the transmission line faults 1054 and 1059) lost 235 of the packets that originated from device 1030a.

The target device 1030a resides within concentrator 1010. With respect to port 1037, this port perceives the messages from the target device 1030a entering via the increment port. According to port 1037, it receives 205 more packets from the target source address than return from the remainder of the network (which to port 1037 are ports 1035f and 1035e as well as the unmanaged points of concentrator 1020). Therefore, its TSA loss counter has a value of +205. The +205 value represents the losses from points 1055, 1056, 1057, and 1058. The TSA loss counters for ports 1035f and 1035e are −4 and −150, respectively, representing that they lost or corrupted, respectively, 4 and 150 of the packets from the target source address.

According to the information of Table 4 generated by the present invention, fault detection and isolation may be performed by a study of the TSA loss counter metrics of the seven ports of FIG. 12. Positive values indicate ports that transmit more packets from the target address than they receive back from the remainder of the network. Further, negative values indicate ports that receive more packets than they recast back to the remainder of the network (they lose or corrupt packets and are therefore fault location indicators). For a given concentrator, the difference in summation of the positive and negative loss metric values represents packets loss within unmanaged points of the concentrator. For instance, the summation of the TSA loss metric values of concentrator 1010 is 11 (−200+(−4)+450+(−235)). This value of 11 represents the 9 packets lost at unmanaged point 1051 and the 2 packets lost at unmanaged point 1053. Further, the summation of the TSA loss metric values of concentrator 1020 is 51 (205+(−4)+(−150)). This represents the 1 packet lost at unmanaged point 1055 and the 50 packets lost at unmanaged point 1058. Also, the difference in the summation of the TSA loss metric values of the two coupling ports 1037 and 1036 indicates the number of packets lost within the transmission link there between. For instance, (−235)+205 is 30 which represents the 5 packets lost at transmission point 1054 and the 25 packets lost at transmission point 1059.

Therefore, given the above analysis, it is clear that the present invention SA loss metric values provide valuable fault detection and isolation techniques with respect to messages originating from a particular target source address station. The results of Table 4 may be transmitted by the NMMs of concentrators 1010 and 1020 to an NMS within the scope of the present invention and visually displayed on screen 105. By inspection of the TSA loss metric values for each port, a network administrator or a fault isolation procedure of the NMS, via the above fault location procedures, may determine quickly which ports of the system are losing or corrupting messages that originate from target device 1030a (i.e., a critical file server). Further, the network administrator or NMS procedure, according to the above fault location procedures, may also determine the number of packets from device 1030a that are being lost within each concentrator at unmanaged locations within each of the concentrators. Alternatively, the administrator or NMS procedure may determine the number of packets from device 1030a that are lost in the transmission connection between concentrators 1010 and 1020.

Detection of Dual Homed Station Thin Connection

Figure 13:
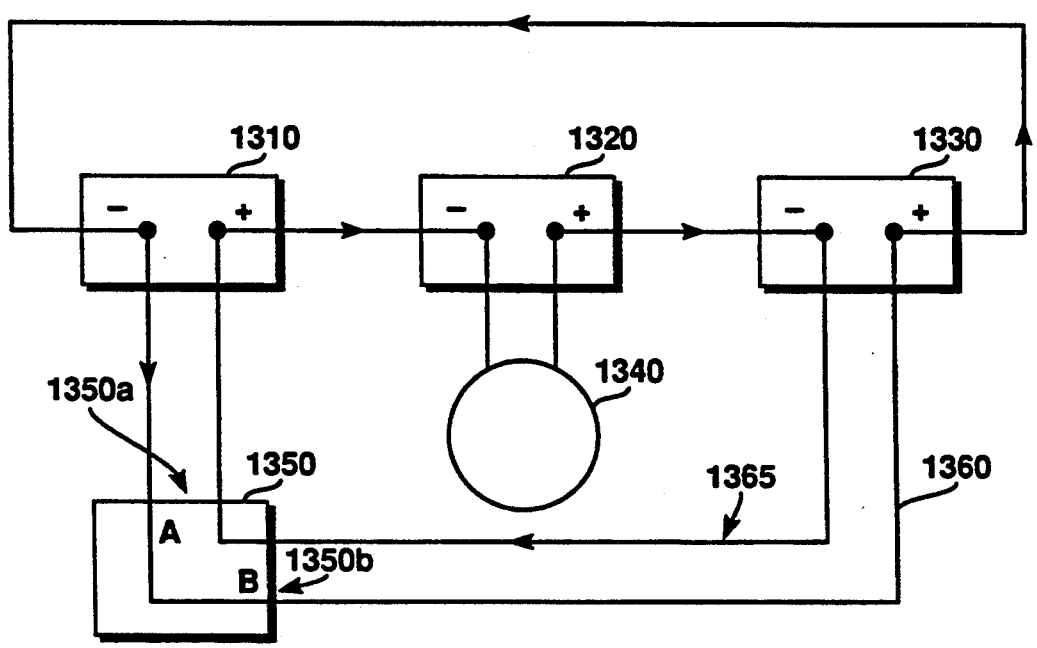
FIG. 13 illustrates a representative ring based communication system having a network configuration error consisting of a dual horned station thru connection error to illustrate the present invention's fault detection capabilities in response to such an error configuration.

FIG. 13 illustrates a network configuration error in which a dual homed station maintains a thru connection. The dual homed station thru connection is an undesirable configuration in which the dual ports (i.e., side A and side B ) of an attached port device are both active when only one should be active at a time. The present invention may be utilized in order to detect the presence of such a configuration. According to FIG. 13, a ring communication network is illustrated comprising ports 1310, 1320, 1330 and dual ported port logic 1350. Port 1320 contains an attached communication station 1340. In proper operation, only port B (i.e., side 1350b) of port logic 1350 should be active. If properly configured, packets entering port logic 1350 from port 1330 should all return to port 1330 back onto the single ring using side B 1350b. However, according to the dual homed station thru connection configuration, side A (1350a) of port logic 1350 is improperly activated so that messages received from station 1310 are improperly routed to station 1330. In effect, a double communication ring forms because port side A is active. The first ring (inner ring) is communication ring 1365 and couples port 1320 and half of ports 1310, 1330 and 1350. The second ring (outer ring)is 1360 and includes the other halves of port devices 1310, 1330, and 1350.

The dual homed station thru connection error is detected according to the generic loss metric configuration of the present invention. Upon activation of port side A of port device 1350, depending on the differential packet flow between the inner ring 1365 and the outer ting 1360 the generic loss metrics of port 1310 and 1330 will obtain relatively large values. These values will be an accurate measure of the difference in traffic rates between the inner and outer rings. These extreme values or magnitudes of the generic loss counters are immediately apparent and will be detected upon application of the present invention. For instance, assuming the communication packet flow of the outer ring 1360 is larger than the flow of the inner ring 1365, the generic loss metric for port 1310 will become increasingly negative as the number of packets decrementing the generic loss counter (i.e., packets flowing into port 1310 from the outer ting) for port 1310 will be larger than the number incrementing the loss counter (i.e., packets flowing out of port 1310 from the inner ring). Likewise for port 1330 its generic loss counter will become increasing positive because the number of packets exiting port 1330 onto the outer ring (i.e., incrementing its generic loss counter) will be greater than the number of packets entering port 1330 from the inner ting (i.e., decrementing its generic loss counter). Since the data flow through port 1320 is completely within the inner communication ring, the generic loss counter for this port should remain zero (assuming no other communication faults within the inner ring).

Therefore, via monitoring of the generic loss values of ports coupled to a dual port station, upon detection of a large negative generic loss metric and a corresponding large positive value, the improper dual homed station thru connection configuration may be detected by the present invention. Further, by isolating the port with the extreme negative generic loss values (i.e., port 1310) the port having the dual homed station thru connection (i.e., port 1350) may be corrected and forced to have only one active port connection.

It is appreciated that if the data flow over the inner ting is larger than the data flow over the outer ring, the generic loss counter for port 1310 obtains a positive value and the generic loss counter for port 1330 is negative. In either case (as above), the value of the generic loss counters indicate the difference in traffic rams between the inner and outer communication rings.

Detection of Stations with Duplicate Addresses

The present invention generic loss counter may also be used to determine if two stations within a single ting communication network have the same station address. Should two stations share the same address, messages originated by one will be stripped by the other (and vice-versa) without being allowed to fully circulate the entire communication ting. The result will be a high positive value of the generic loss counter associated with the port that is generating the most messages and a high negative value of the generic loss counter associated with the port where the most messages are stripped. The magnitude of the difference between the generic loss counters for two stations with the same addresses will indicate the difference in the amount of messages generated by the two stations. By monitoring the generic loss counters for all ports of the network, an indication of relatively large negative generic loss counter in one port logic block and a corresponding relatively large positive generic loss counter value within another port logic block of the present invention may lead to detection of two stations having a duplicate address.

Detection of Repetitive Transmission Breaks

The present invention generic loss counter may also be utilized for detection of repetitive transmission breaks within a communication network. The amount of traffic lost at the breaking port appears as a negative count within the generic loss counter for the breaking port. The other ports within the network will record the amount of traffic lost at that break with positive counts of their generic loss counters. These momentary breaks will be discovered by repetitively monitoring the generic loss counter for the entire network or by inspection of the generic loss metrics (i.e., histogram) of the ports of the network for a given sample of time. The time interval containing the transmission break will then contain the negative and positive counts of the generic loss counters.

Dual Ring Faults

Figure 14A:
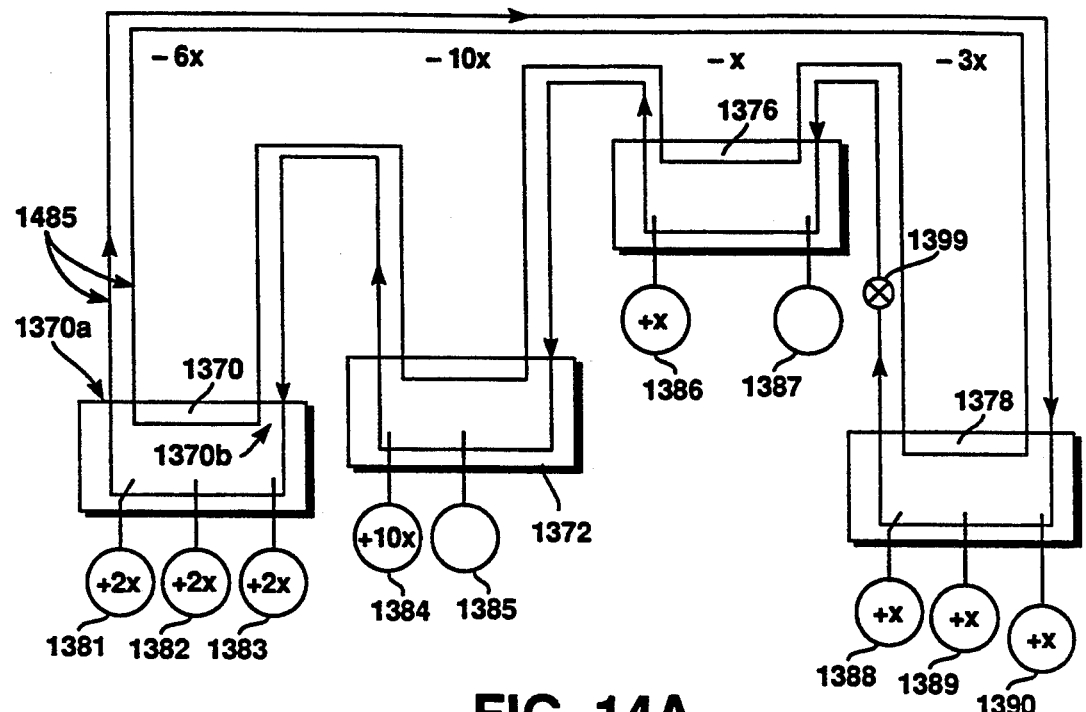
FIG. 14(A) illustrates a representative dual ting communication system utilizing ports of the present invention which indicate that the concentrator generating the most traffic reports the most errors.

FIG. 14(A) illustrates a well known dual ring communication network. While dual ring faults are generally not as manageable by the loss metric embodiments of the present invention, it is clear that the concentrator generating the most traffic will show the most errors within the present invention. For instance, assuming that within concentrator 1370 there is a two port loss metric associated with both the input stream port (1370b) and output stream port (1370a) and also for each of the other concentrator ports (i.e., for 1372, 1376, and 1378). A two port loss metric is used by the present invention because of the dual ting nature of the network of FIG. 14(A). As a two port loss metric, the loss metric associated with the communication link for concentrator 1370 is made up of the input port 1370b and the exit port 1370a which are on two different ports of the concentrator. The two port loss counter 220 of the present invention for concentrator 1370 is decremented by incoming messages over the input port 1370b and the loss counter 220 is incremented by outgoing messages of the output port 1370a. A two port loss metric is required in a dual ring topology because messages entering a concentrator over a particular port do not necessarily traverse that port again before being removed from the network (as would be the case in a single ring communication scheme). Since two port devices are required to update the loss counter for this concentrator, the two ports must directly communicate with each other to maintain the resultant loss counter. Therefore, each concentrator has an associated two-port loss counter value representing the message traffic through the concentrator as a whole; the value for each concentrator is represented above each within FIG. 14(A) as $-6x, -10x, -x,$ and $-3x$, respectively, for concentrators 1370, 1372, 1376, and 1378.

Assume a fault within the network of FIG. 14(A) occurs at point 1399 where packets are lost or corrupted. The concentrator that generates the most packets over the network of FIG. 14(A) is concentrator 1372 because its attached station 1384 has the largest relative positive count within its loss counter (i.e., $+10x$). Associated with the two-port loss metric of concentrator 1372 is a value of $-10x$ which is the largest negative count of the two-port loss counter of the concentrators of the network. Therefore, the concentrator generating the largest mount of packets is showing the largest amount of errors. The present invention allows detection of concentrator 1372 as generating the most packets. Relative packet generation rates for the other stations within the other concentrators are illustrated in the communication network of FIG. 14(A) as introduced above. However, to more particularly isolate the fault under the present invention, the dual ring communication network must be converted into a single ting system as shown in FIG. 14(B) and discussed below.

Figure 14B:
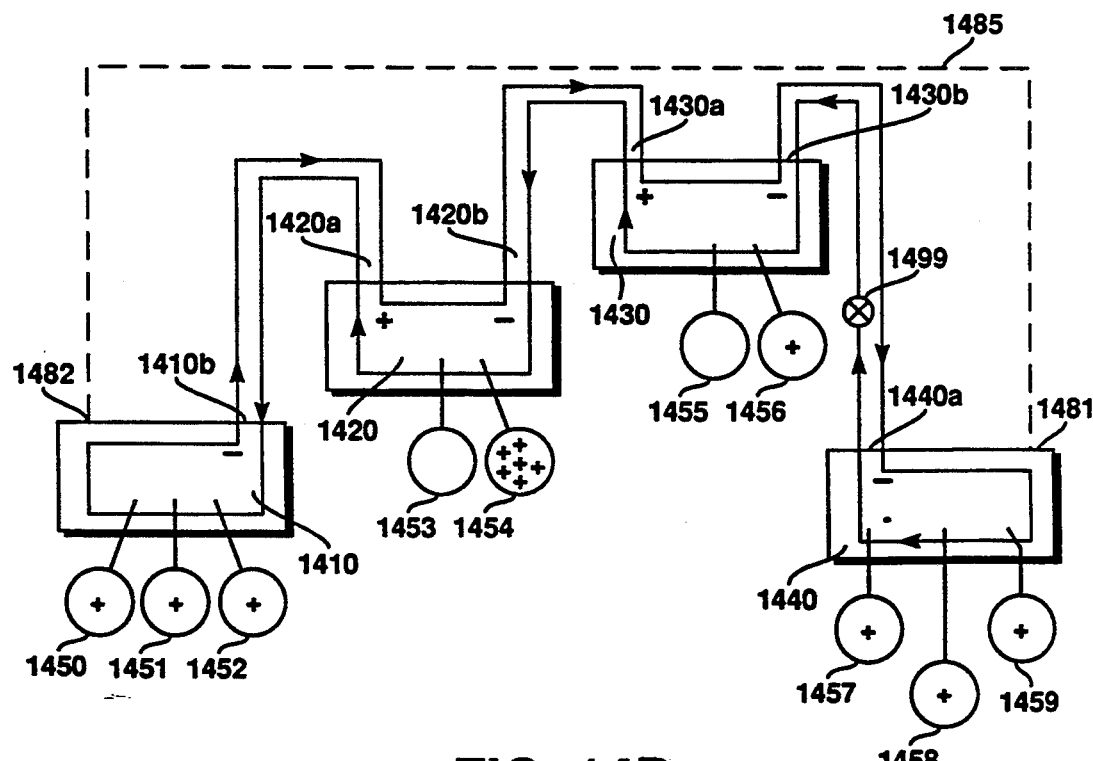
FIG. 14(B) illustrates the network of FIG. 14(A) with the dual ting made open and ring wrapping at the port end points creating a network that can be accurately fault isolated by the generic loss metric embodiment of the present invention.

FIG. 14(B) illustrates the network communication configuration of FIG. 14(A) with the dual ring forced open while one-port loss metrics are collected to allow fault isolation according to the present invention. First, the dual ting link (i.e., coupling 1485 shown in a dashed line) is severed. The communication network that results utilizes ring wrapping at end points 1482 and 1481 to create a type of topology with a single resultant communication ting. According to the topology of FIG. 14(B), all messages entering a concentrator port must necessarily traverse that same port once again before they are eliminated from the network. Each concentrator link of the present invention then utilizes one-port loss metrics. By utilizing the resultant generic loss metrics of the present invention, the direction of the fault will always be known. For instance, assume a fault at location 1499. A negative generic loss metric for a port indicates the direction of the fault. Starting with a particular concentrator, such as the port link of concentrator 1410, the generic loss metric for this port 1410b is negative. This indicates that the fault is within the associated concentrator 1420 that couples to concentrator 1410 via port 14 10b. None of the single stations attached to concentrator 1420 have negative generic loss metrics for their associated ports. Since the generic loss metric of port 1420a of concentrator 1420 is positive the fault does not lie between concentrators 1420 and 1410. Also, since the generic loss metric of port 1420b is negative the fault lies in that direction. None of the single stations attached to concentrator 1430 have negative generic loss metrics for their associated ports. Again, since the generic loss metric of port 1430a is positive the fault does not lie between concentrators 1420 and 1430. The generic loss metric of port 1430b is negative indicating the direction of the fault 1499.

None of the single stations attached to concentrator 1440 have negative generic loss counters associated with their ports. The generic loss counter for port 1440a contains a negative value indicating the direction of the fault. Using the generic loss counter for port 1430b (negative) and the generic loss counter value for port 1440a (negative) it can be determined that the network fault lies within the transmission coupling between concentrators 1440 and 1430 as expected (i.e., the precise location of fault 1499). Therefore, the present invention generic loss metric may be used to indicate the direction of a communication fault, and ultimately, the precise location of the fault within a larger network.

Loss Metric Processing Procedure of the Present Invention

Figure 15:
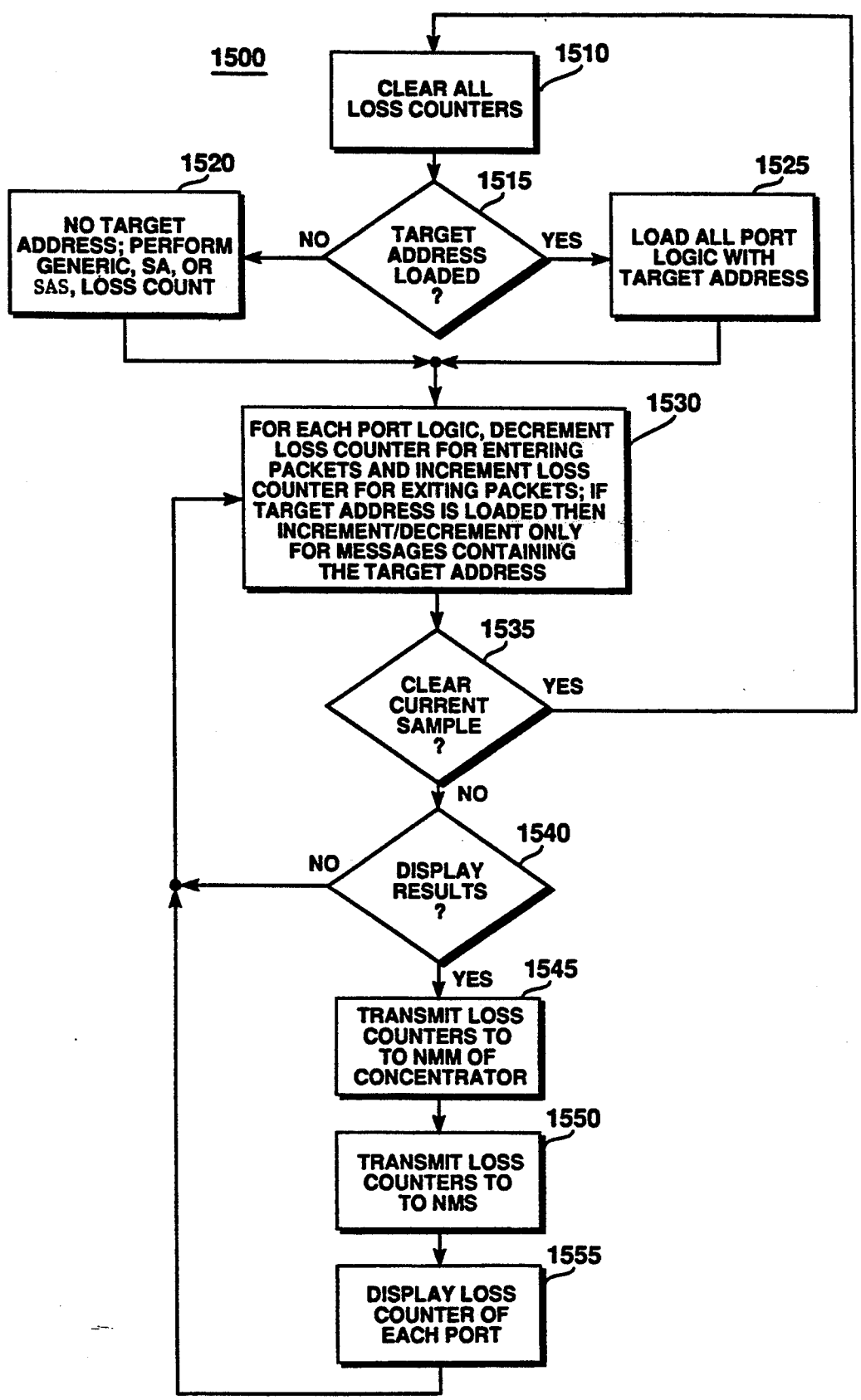
FIG. 15 is a flow diagram illustrating the major processing tasks executed by the fault detection and isolation procedures of the present invention for both the generic loss metric embodiment and the source address loss metric embodiment.

FIG. 15 is a flow diagram illustrating the major processing tasks performed by the generic loss metric, the source address loss metric and the targeted source address loss metric implementations of the present invention. The overall procedure 1500 may be utilized for both fault detection and fault isolation as an end result of the procedure is a visualization (over the NMS) of the loss metrics (i.e., generic, SA loss metric, and TSA loss metric) for each port within a given ring communication network. The process 1500 enters at block 15 10 where the previous values for the loss counters for each port logic are initially cleared. This may be accomplished directly by activation of the pertinent NMMs associated with each port logic device or may be accomplished by instruction to each port logic device over the communication network. The present invention then proceeds to block 1515 where it is determined whether or not a target address (target source address) is present to be loaded into each of the port logic devices of the ring communication network for the targeted source address (TSA) loss metric. If there is not a target address available (i.e., supplied from the NMS or other attached station) then processing proceeds to block 1520 where the loss counters will be measuring the generic loss metric, the source address (SA) loss metric for the SAS loss metric for a given attached port. If the present invention measures the SA loss metric then for a given port, the address of its attached device is loaded in to the reference buffer for the given port's packet detectors. For the generic loss metric all packets are processed by the packet detectors. If the attached device is a single station then the present invention measures the SAS loss metric by computing the difference between the generic loss metric and the SA loss metric. If there is a target address loaded from the NMS (i.e., by a network administrator or another NMS procedure), then the processing of the present invention flows from block 1515 to block 1525 where the NMS broadcasts the target address to every port logic device within the network (via the appropriate NMMs). The value of the target address is then pre-loaded into each reference buffer of each packet detector of each port logic device of the communication network. Both blocks 1525 and 1520 flow to block 1530 next.

The procedures of block 1530 are carried out by each port logic device of the network in order to compute the appropriate loss metric for each port. If the generic loss metric is to be computed then at block 1530 upon each port receiving a good packet from the network it will decrement the generic loss counter 220 for that port logic. Upon each port transmitting a good packet to the network it will increment the generic loss counter 220 for that port logic. According to block 1530 if the target address is loaded into the packet detectors (210 and 230) for each port then above increment and decrement functions will be carried out only for those packets that contain the target source address. In such a case, at block 1530, each message will be inspected to determine if the point of origin is from the target source address before the loss counter is updated. After a programmable sampling interval is reached, the present invention enters block 1535 where the present invention determines if a command to clear the current metric measurement sample is present. If so, the procedure returns to block 1510. If not, the procedure of the present invention continues to block 1540 where it is determined if the results of the loss metric computations need to be displayed. If not, then processing continues to block 1530 where the loss metrics are computed for another time interval or until a request interrupt is generated for visualization of the loss metrics.

If a display of the computed loss metrics is desired (i.e., from a request by the NMS) then at block 1545 the results of each of the computed loss metric value (i.e., the last value for each loss counter 220) for each port logic device is transmitted to the NMM of the concentrator that contains the port logic device. At block 1550, each NMM of the network transmits the values of its associated loss metrics along with an identifier of the port to which the loss metric belongs. Then at block 1555, the NMS utilizes the information gathered from each NMM to construct a list in computer memory illustrating each port identification and its associated generic, source address, or targeted source address loss metric for the given sampling period. This list is then rendered over the display screen 105 of the NMS. This information may be updated and displayed in real-time by the present invention cycling again to block 1530. It is appreciated that the above procedure is but one implementation of utilizing the results of the loss counters of present invention for fault detection and isolation. Other similar procedures utilizing the results of the loss counters of the present invention should be considered within the scope and spirit of the present invention.

For the case of the SA loss metric, the processing flow is similar to that of FIG. 15 except at block 1525 individual ports of the network are loaded with a unique address of the device attached to an individual port. For the SAS loss metric, a particular port's reference buffer is loaded with the address of its single attached station and then the packets detectors of the present invention for that particular port are effectively responsive only to messages that do not originate from the single attached station; this is accomplished via block 1530.

It is appreciated that the present invention packet detector out unit 230 of a given port may be implemented from a packet detector in unit of a down stream communication port to the given port. In effect, messages flowing out of a given port are similar to those flowing into the down stream port of the given port (assuming there are no transmission faults between the ports). Therefore, an obvious equivalent arrangement would be to utilize a packet detector out unit associated with a up stream port from a given port in lieu of using a packet detector in unit within the given port in order to compute the loss metric figures for the given port. In such a system, the two packet detector in units must communicate between the given port and the up stream port to produce the loss metric for the given port. Such an alternative system is understood to be equivalent to a system employing both a packet detector in unit and a packet detector out unit in a given port.

It is appreciated that communication networks of the present invention may be composed of classes of ports that are specially implemented with the packet detectors and loss metric components of the present invention along with other alternate classes containing ports of a prior an design that have no loss metric capabilities. It should be further appreciated that a network having a mixture of the above port classes does not depart from the present invention but is within the scope and spirit of the present invention. In such an implementation, the present invention will operate to generate, display and utilize the loss metrics of those specialized ports implemented within the present invention while the ports of the prior an design are treated as, and thus and should be defined and interpreted as, unmanaged points within the present invention.

The preferred embodiment of the present invention, a system including circuitry within individual port devices for determining the presence and location of communication faults within a ring communication network by recording over time the performance of an attached device by measuring the difference between (1) the number of good packets generated from a particular port that return to the port as good from the remainder of the network and (2) the number of packets that are received into that port as good and are thereafter transmitted as good to the rest of the network from that same particular port, is thus described. While the present invention has been described in particular embodiments, it should be appreciated that the present invention should not be construed as limited by such embodiments, but rather construed according to the claims that follow.

What is claimed is:

1. An apparatus for measuring performance of a port within a communication network having a plurality of ports, said ports capable of individually interfacing with attached stations or devices, said apparatus comprising:
    first packet detecting means operable within said port of said network for detecting a message packet entering said port, said first packet detecting means coupled to an input communication stream to said port;
    second packet detecting means operable within said port for detecting a message packet exiting said port, said second packet detecting means coupled to an output communication stream from said port; and
    counter means for maintaining a count value indicating an amount of messages lost or corrupted by said port and indicating an amount of messages lost or corrupted by said network, said counter means communicatively coupled to said first packet detecting means and communicatively coupled to said second packet detecting means.

2. An apparatus for measuring performance of a port within a communication network as described in claim 1 wherein said first packet detecting means comprises means for decrementing said count value of said counter means upon detection of a good entering message packet and wherein said second packet detecting means comprises means for incrementing said count value of said counter means upon detection of a good exiting message packet.

3. An apparatus for measuring performance of a port within a communication network as described in claim 2 wherein said first packet detecting means and said second packet detecting means further individually comprise means for detecting a good message packet by examining frame class and performing a cyclical redundancy checksum (CRC) on said exiting and said entering message packets.

4. An apparatus for measuring performance of a port within a communication network as described in claim 2 further comprising:
    means for receiving a source address which is an address of a device attached to a first port, said means for receiving a source address operable within said first port of said network;
    first packet detecting means operable within said first port for detecting a message packet containing said source address and entering said first port, said first packet detecting means coupled to an input communication stream to said first port;
    second packet detecting means operable within said first port for detecting a message packet containing said source address and exiting said first port, said second packet detecting means coupled to an output communication stream from said first port; and
    source address counter means for maintaining a source address loss metric indicating an amount of messages originating from said source address and lost or corrupted by said network, said source address counter means communicatively coupled to said first packet detecting means and communicatively coupled to said second packet detecting means.

5. An apparatus for measuring performance of a port within a communication network as described in claim 4 wherein said device attached to said first port is an address of a single attached station to said first port and wherein said count value is a generic loss metric, and further comprising:
    means for determining a single attached station loss metric by computing a difference between said generic loss metric and said source address loss metric.

6. An apparatus for measuring performance of a port within a communication network as described in claim 1 further comprising:
    means for reporting said count value of said port to a network management station, said count value representative of a determined sample time interval; and
    means for generating a visualization of said count value for said port on a display screen.

7. An apparatus for determining fault location within a ring communication network having a plurality of ports, said ports for individually interfacing with attached stations or devices, said apparatus comprising:
    means for receiving an address, said means for receiving an address operable within a first port of said network;
    first packet detecting means operable within said first port for detecting a message packet containing said address and entering said first port, said first packet detecting means coupled to an input communication stream to said first port;
    second packet detecting means operable within said first port for detecting a message packet containing said address and exiting said first port, said second packet detecting means coupled to an output communication stream from said first port; and
    counter means for maintaining a loss metric indicating an amount of messages containing said address and lost or corrupted by said first port and indicating an amount of messages containing said address and lost or corrupted by said network, said counter means communicatively coupled to said first packet detecting means and communicatively coupled to said second packet detecting means.

8. An apparatus for determining fault location within a ring communication network as described in claim 7 wherein said first packet detecting means comprises:
    means for storing said address;
    means for comparing said message packet to said address of said means for storing said address;

means for determining if said message packet is good; and means for decrementing said loss metric of said port if said message packet contains said address and is determined to be good.

9. An apparatus for determining fault location within a ring communication network as described in claim 8 wherein said second packet detecting means comprises:

means for comparing said message packet to said address of said means for storing said address;

means for determining if said message packet is good; and means for incrementing said loss metric of said port if said message packet contains said address and is determined to be good.

10. An apparatus for determining fault location within a ring communication network as described in claim 7 wherein said address is an address of a device attached to said first port and wherein said loss metric is a source address loss metric, and further comprising:

means for loading said source address into said first port;

means for timing a determined sample time interval;

means for reporting said source address loss metric of said port to a network management station, said source address loss metric representative of said determined sample time interval; and means for generating a visualization of said source address loss metric on a display screen.

11. An apparatus for determining fault location within a ring communication network as described in claim 10 wherein said first packet detecting means comprises:

means for storing said source address;

means for comparing said message packet to said source address of said means for storing said source address; and means for decrementing said source address loss metric of said first port if said message packet contains said source address, and wherein said second packet detecting means comprises:

means for comparing said message packet to said source address of said means for storing said source address; and means for incrementing said source address loss metric of said port if said message packet contains said address.

12. An apparatus for determining fault location within a ring communication network as described in claim 7 wherein said address is a target address and wherein said loss metric is a targeted address loss metric, and further comprising:

means for obtaining said target address from an external source;

means for timing a determined sample time interval;

means for reporting said targeted address loss metric of said port to a network management station, said targeted address loss metric representative of said determined sample time interval; and means for generating a visualization of said loss metric on a display screen.

13. An apparatus for measuring communication performance of individual ports within a communication network that are of a first class of ports, said apparatus comprising:

first packet detecring means operable within a port logic unit of said each individual port of said network for detecring message packets entering said each individual port, said first packet detecring means coupled to an input communication stream to said each individual port;

second packet detecring means operable within said port logic unit of said each individual port for detecring message packets exiring said each individual port, said second packet detecring means coupled to an output communication stream from said each individual port; and counter means for maintaining a loss metric indicaring an amount of messages lost or corrupted by said each individual port and indicaring an amount of messages lost or corrupted by said network, said counter means communicatively coupled to said first packet detecring means and communicatively coupled to said second packet detecring means.

14. An apparatus for measuring performance of individual ports of a first class of ports within a ring communication network as described in claim 13 wherein said first packet detecring means comprises means for decremenring said loss metric of said port upon detection of a good entering message packet and wherein said second packet detecring means comprises means for incremenring said loss metric of said port upon detection of a good exiring message packet of said each individual port.

15. An apparatus for measuring performance of individual ports of a first class of ports within a ring communication network as described in claim 14 further comprising:

means responsive to a report signal for transmitring loss metrics of each individual port of said network to a network management station; and means for generating a visual display on a display screen of each loss metric for said each individual port of said network.

16. An apparatus for measuring performance of individual ports of a first class of ports within a ring communication network as described in claim 13 further comprising:

means for transmitring a target address to each individual port of said network; and means operable within said each individual port for receiving said target address.

17. An apparatus for measuring performance of individual ports of a first class of ports within a ring communication network as described in claim 16 wherein said first packet detecring means comprises:

means for receiving and storing said target address;

first comparison means for comparing source addresses of said message packets entering said each individual port against said target address; and means for decremenring said loss metric of said each individual port if said first comparison means indicates that a message packet entering said each individual port originated from said target address.

18. An apparatus for measuring performance of individual ports of a first class of ports within a ring communication network as described in claim 17 wherein said second packet detecring means comprises:

second comparison means for comparing source addresses of said message packets exiring said each individual port against said target address; and means for incremenring said loss metric of said each individual port if said second comparison means indicates that a message packet exiring said each individual port originated from said target address.

19. An apparatus for measuring performance of individual ports of a first class of ports within a ring communication network as described in claim 18 further comprising:
   means responsive to a report signal for transmitring loss metrics of each individual port of said network to a network management station; and
   means for generaring a visual display on a display screen of each loss metric for said each individual port of said network.

20. An apparatus for measuring performance of individual ports of a first class of ports within a ring communication network as described in claim 13 wherein said first packet detecring means and said second packet detecring means individually comprise filter means for detecring messages of a determined frame class and wherein said first packet detecring means and said second packet detecring means update said counter means only with respect to messages of said determined frame class.

21. An apparatus for measuring performance of individual ports of a first class of ports within a ring communication network as described in claim 13 wherein said first packet detecring means and said second packet detecring means are coupled, respectively, to input and output streams of two separate ports of a dual ported port device and wherein said dual ported port device comprises two separate loss metrics.

22. An apparatus for generaring loss metrics representative of a plurality of individual ports of a first class within a ring based communication network, said apparatus comprising:
   counter means operable within each port of said network for maintaining a loss metric indicaring an amount of messages lost or corrupted by said each port and also indicaring an amount of messages lost or corrupted by said network; and
   message packet detecring means operable within said each port of said network for decremenring said loss metric upon detecring a good message packet entering said each port and for incremenring said loss metric upon detecring a good message packet exiring said each port, said message packet detecring means communicatively coupled to said counter means.

23. An apparatus for generaring loss metrics representative of a plurality of individual ports within a ring based communication network as described in claim 22 further comprising:
   means for resetring each loss metric of said each port of said first class;
   means for timing a sample interval;
   means for transmitring said each loss metric for said each port to a network management station; and
   means for displaying a visualization of each loss metric for said each port onto a display screen representative of said sample interval.

24. An apparatus for generaring loss metrics representative of a plurality of individual ports of a first class within a ring based communication network, said apparatus comprising:
   counter means operable within each port of said network for maintaining a source address loss metric indicaring an amount of messages containing a source address of a device coupled to said each port and lost or corrupted by said network; and
   message packet detecring means operable within said each port of said network for decremenring said source address loss metric upon detecring a good message packet entering said each port and containing said source address and for incremenring said source address loss metric upon detecring a good message packet exiring said each port and containing said source address, said message packet detecring means communicatively coupled to said counter means.

25. An apparatus for generaring loss metrics representative of a plurality of individual ports within a ring based communication network as described in claim 24 further comprising:
   means for resetring each source address loss metric of said each port;
   means for generaring and loading an individual source address to said each port within said network;
   means for timing a sample interval;
   means for transmitring said each source address loss metric for said each port to a network management station; and
   means for displaying onto a display screen a visualization of each loss metric for said each port representative of said sample interval.

26. An apparatus for generaring loss metrics representative of a plurality of individual ports within a ring based communication network as described in claim 24 wherein said message packet detecring means comprises:
   storage means for loading said source address from said network;
   first means for comparing said source address against source addresses of message packets entering said each port; and
   means for decremenring said source address loss metric if said first means for comparing indicates that a message packet entering said each port contains said source address and said message packet is determined to be good.

27. An apparatus for generaring loss metrics representative of a plurality of individual ports within a ring based communication network as described in claim 26 wherein said message packet detecring means comprises:
   second means for comparing said source address against source addresses of message packets exiring said each port; and
   means for incremenring said source address loss metric if said second means for comparing indicates that a message packet exiring said each port contains said source address and said message packet is determined to be good.

28. A ring based communication network comprising:
   (a) a plurality of port devices of a first class for providing communication links to communication devices;
   (b) a plurality of concentrators for providing communication hubs for said plurality of ports; and
   (c) means for measuring communication performance of said plurality of ports within said communication network, said means for measuring comprising:
      first packet detecring means operable within a port logic unit of each port of said first class for detecring message packets entering said each port, said first packet detecring means coupled to an input communication stream to said each port;

second packet detecring means operable within said port logic unit of said each port of said fast class for detecring message packets exiring said each port, said second packet detecring means coupled to an output communication stream from said each port; and counter means for maintaining a loss metric indicaring an amount of messages lost or corrupted by said each port and indicaring an amount of messages lost or corrupted by said network, said counter means communicatively coupled to said first packet detecring means and communicatively coupled to said second packet detecring means.

29. A ring based communication network as described in claim 28 wherein said first packet detecring means comprises means for decremenring said loss metric of said each port upon detection of a good entering message packet and wherein said second packet detecring means comprises means for incremenring said loss metric of said each port upon detection of a good exiring message packet from said each port.

30. A ring based communication network as described in claim 29 further comprising:

means responsive to a report signal for transmitring loss metrics of each port of said first class to a network management station; and means for generaring a visual display on a display screen of each loss metric for said each port.

31. A ring based communication network as described in claim 30 wherein said address for a given port is a source address of a device coupled to said given port and wherein, for said given port, said first packet detecring means comprises:

means for receiving said source address;

means for storing said source address;

comparison means coupled to said means for storing for comparing source addresses of said message packets entering and exiring said given port against said source address; and means for updaring said loss metric of said given port if said comparison means indicates that a message packet entering or exiring said given port contains said source address.

32. A ring based communication network as described in claim 28 further comprising:

means for providing an address to said each port of said network; and means operable within said each port for receiving said address.

33. A ring based communication network as described in claim 32 wherein said first packet detecring means comprises:

means for storing said address;

first comparison means coupled to said means for storing for comparing addresses of said message packets entering said each port against said address; and means for decremenring said loss metric of said each port if said first comparison means indicates that a message packet entering said each port contains said address.

34. A ring based communication network as described in claim 33 wherein said second packet detecring means comprises:

second comparison means coupled to said means for storing for comparing addresses of said message packets exiring said each port against said address; and means for incremenring said loss metric of said each port if said second comparison means indicates that a message packet exiring said each port contains said address.

35. A ring based communication network as described in claim 34 further comprising:

means responsive to a report signal for transmitring each loss metric of said each port to a network management station; and means for generaring a visual display on a display screen of said each loss metric for said each port.

36. A ring based communication network as described in claim 32 wherein said address is a target address and wherein said first packet detecring means comprises:

comparison means coupled to said means for storing for comparing addresses of said message packets entering and exiring said each port against said target address; and means for updating said loss metric of said each port if said comparison means indicates that a message packet entering or exiring said each port contains said target address.

37. A method for measuring performance of a port within a ring communication network having a plurality of ports, said ports capable of individually interfacing with attached stations, said method comprising the steps of:

first step of detecring good message packets entering said port;

updaring a loss metric for said port to reflect said first step of detecring;

second step of detecring good message packets exiring said port;

updaring said loss metric for said port to reflect said second step of detecring; and maintaining said loss metric indicaring an amount of messages lost or corrupted by said port and indicaring an amount of messages lost or corrupted by said network.

38. A method for measuring performance of a port within a ring communication network as described in claim 37 wherein said step of updaring said loss metric of said port to reflect said first step of detecring comprises the step of decremenring said loss metric of said port upon detection of a good entering message packet of said message packets entering said port.

39. A method for measuring performance of a port within a ring communication network as described in claim 38 wherein said step of updaring said loss metric of said port to reflect said second step of detecring comprises the step of incremenring said loss metric of said port upon detection of a good exiring message packet of said message packets exiring said port.

40. A method for measuring performance of a port within a ring communication network as described in claim 37 further comprising the steps of:

sampling said loss metric of said port over a determined time interval;

reporring said loss metric of said port to a network management station, said loss metric representative of said determined time interval: and generaring a visualization of said loss metric of said port on a display screen.

41. A method of measuring performance of a port within a ring communication network as described in claim 37 wherein said first step of detecring a message packet entering said port comprises the steps of:
  comparing said message packets entering said port to an address;
  determining if said message packets entering said port are good; and
  registering a detection if an entering message packet contains said address and if said entering message packet is determined to be good.

42. A method of measuring performance of a port within a ring communication network as described in claim 41 further comprising the steps of:
  receiving said address into said communication network;
  transmitring said address to said port;
  sampling said loss metric of said port over a determined time interval;
  reporring said loss metric of said port to a network management station, said loss metric representative of said determined time interval; and
  generating a visualization of said loss metric of said port on a display screen.

43. A method for measuring performance of a port within a ring communication network as described in claim 42 wherein said step of updaring said loss metric of said port to reflect said first step of detecring comprises the step of decremenring said loss metric of said port; and wherein said step of updaring said loss metric of said port to reflect said second step of detecring comprises the step of incremenring said loss metric of said port.

44. A method of measuring performance of a port within a ring communication network as described in claim 41 wherein said second step of detecring a message packet exiring said port comprises the steps of:
  comparing said messages exiring said port to said address;
  determining if an exiring message packet is good; and
  registering a detection if said exiring message packet contains said address and if said exiring message packet is determined to be good.

45. A method of measuring performance of a port within a ring communication network as described in claim 37 wherein said first step of detecring a message packet entering said port comprises the steps of:
  comparing said entering message packets to a source address which is an address of an attached device to said port;
  determining if an entering message packet is good; and
  registering a detection if said entering message packet contains said source address and if said entering message packet is determined to be good.

46. A method of measuring performance of a port within a ring communication network as described in claim 45 wherein said second step of detecring a message packet exiring said port comprises the steps of:
  comparing said exiring message packet to said source address;
  determining if an exiring message packet is good; and
  registering a detection if said exiring message packet contains said source address and if said exiring message packet is determined to be good.

47. A method for fault detection and location within a ring communication network having at least one concentrator, said at least one concentrator for housing at least one port, said method comprising the steps of:
  (a) determining a loss metric for a particular port of said network, said step of determining a loss metric for said particular port further comprising the steps of:
    first step of detecring a good message packet entering said particular port;
    decremenring said loss metric for said particular port to reflect said first step of detecring;
    second step of detecring a good message packet exiring said particular port;
    incremenring said loss metric for said particular port to reflect said second step of detecring; and
    maintaining said loss metric indicaring an amount of messages lost or corrupted by said particular port and indicaring an amount of messages lost or corrupted by said network;
  (b) upon an determined time interval, transmitring said loss metric to a central network storage location; and
  (c) generaring a visualization comprising loss metrics of several ports of said communication network onto a display means.

48. A method for fault detection and location within a ring communication network as described in claim 47 further comprising the step of determining that a fault is associated with a given port of a given concentrator if a loss metric of said given port is the only negative loss metric associated with said given concentrator.

49. A method for fault detection and location within a ring communication network as described in claim 47 further comprising the step of determining that a fault within a given concentrator is located within a unmanaged point if loss metrics for all ports of said given concentrator are positive.

50. A method for fault detection and location within a ring communication network as described in claim 47 further comprising the step of determining that a fault exists within a transmission line between two attached ports if loss metrics for both said attached ports are negative.

51. A method for fault detection and location within a ring communication network as described in claim 47 further comprising the step of determining the presence of a dual homed station thru connection error if loss metrics for two ports coupled to a dual ported station comprise a relatively large negative value and a relatively large positive value.

52. A method for fault detection and location within a ring communication network as described in claim 47 further comprising the step of determining the presence of a first and a second station sharing the same address if a loss metric for said first station is relatively large and negative and a loss metric for said second station is relatively large and positive.

53. A method for fault detection and location within a ring communication network having at least one concentrator, said at least one concentrator for housing at least one port, said method comprising the steps of:
  (a) determining a loss metric for a particular port of said network, said step of determining a loss metric for said particular port further comprising the steps of:
    decremenring said loss metric for said particular port if a good message packet is detected entering said particular port and contains an address;
    incremenring said loss metric for said particular port if a good message packet is detected exiring said particular port and contains said address; and maintaining said loss metric indicaring an amount of messages originaring from said address that are lost or corrupted by said particular port and indicaring an amount of messages originating from said address that are lost or corrupted by said network;

(b) upon an determined time interval, transmitring said loss metric of said particular port to a central network storage location; and (c) generaring a visualization comprising loss metrics of several ports of said communication network onto a display means.

54. A method for fault detection and location within a ring communication network as described in claim 53 wherein said address is a source address of a device coupled to said particular port and further comprising the steps of:

decremenring a generic loss metric for said particular port if a good message packet is detected entering said particular port;

incremenring said generic loss metric for said particular port if a good message packet is detected exiring said particular port;

maintaining said generic loss metric indicaring an amount of messages originaring from said particular port that are lost or corrupted by said network and indicaring an amount of messages originating from said network that are lost or corrupted by said particular port; and determining a single attached station loss metric by compuring a difference between said generic loss metric and said loss metric.

55. A method for fault detection and location within a ring communication network as described in claim 53 further comprising the step of determining the number of faults at unmanaged locations within a given concentrator by summing loss metrics of the ports of said given concentrator.

56. A method for fault detection and location within a ring communication network as described in claim 53 further comprising the step of determining the number of message packets lost or corrupted within a transmission line coupling a first port and a second port by summing the loss metrics for said first port and said second port.

* * * * *